(12) United States Patent
Philavong et al.

(10) Patent No.: US 9,124,517 B2
(45) Date of Patent: Sep. 1, 2015

(54) NETWORK SYSTEM AND NETWORK REDUNDANCY METHOD

(75) Inventors: Minaxay Philavong, Tokyo (JP); Masanori Takashima, Tokyo (JP); Youichi Hidaka, Tokyo (JP); Tetsu Izawa, Tokyo (JP); Shihomi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 497 days.

(21) Appl. No.: 13/520,776

(22) PCT Filed: Jan. 4, 2011

(86) PCT No.: PCT/JP2011/050016
§ 371 (c)(1),
(2), (4) Date: Nov. 30, 2012

(87) PCT Pub. No.: WO2011/083785
PCT Pub. Date: Jul. 14, 2011

(65) Prior Publication Data
US 2013/0077481 A1    Mar. 28, 2013

(30) Foreign Application Priority Data
May 1, 2010  (JP) .................................. 2010-000819

(51) Int. Cl.
*H04L 12/44*  (2006.01)
*H04L 12/947*  (2013.01)
(Continued)

(52) U.S. Cl.
CPC ............ *H04L 49/25* (2013.01); *H04L 41/0668* (2013.01); *H04L 45/38* (2013.01); *H04L 45/66* (2013.01); *H04L 45/22* (2013.01)

(58) Field of Classification Search
CPC ...................................................... H04L 45/28
USPC ......................................... 370/228, 225, 216
See application file for complete search history.

(56) References Cited

U.S. PATENT DOCUMENTS

| 2007/0217388 A1 | 9/2007 | Shiizaki et al. |
| 2008/0037988 A1* | 2/2008 | Bullock .......................... 398/59 |
| 2009/0275395 A1* | 11/2009 | McAllister et al. ............. 463/25 |
| 2011/0281605 A1 | 11/2011 | Shiizaki et al. |

FOREIGN PATENT DOCUMENTS

| CN | 101202705 A | 6/2008 |
| CN | 1946058 A | 4/2011 |

(Continued)

OTHER PUBLICATIONS

McKeown, OpenFlow: Enabling Innovation in Campus Networks, Mar. 14, 2008, 6 pages.*

(Continued)

*Primary Examiner* — Andrew Lai
*Assistant Examiner* — Zhiren Qin
(74) *Attorney, Agent, or Firm* — McGinn IP Law Group, PLLC

(57) ABSTRACT

In a network system in which a switch forwarding packets and a control server determining route information are separated, it is desired to achieve a redundancy of the control channel by an out-of-band control channel and an in-band control channel, when the switch receives a control message regarding the flow entry registration and the like based on the route information from the control server. Specifically, the separated switch and control server are connected by a control channel for sending and receiving the control message. The switch is not only connected to a control server via an out-of-band control channel by a route dedicated to the control message, but also connected to another control server via an in-band control channel by a route which is common with a normal data communication for determining the route information, to achieve a redundancy of the control channel.

13 Claims, 20 Drawing Sheets

(51) Int. Cl.
  H04L 12/721 (2013.01)
  H04L 12/24 (2006.01)
  H04L 12/707 (2013.01)

(56) References Cited

FOREIGN PATENT DOCUMENTS

| JP | 2000-078194 A | 3/2000 |
| JP | 2002-344409 A | 11/2002 |
| JP | 2003-273907 A | 9/2003 |
| JP | 2004-235791 A | 8/2004 |
| JP | 2007-251344 A | 9/2007 |
| JP | 2009-200721 A | 9/2009 |

OTHER PUBLICATIONS

McKeown, OpenFlow: Enabling Innovation in Campus Network, Mar. 14, 2008, 6 pages.*
Japanese Office Action dated Jan. 29, 2014, with English translation.
Tetsuo Kobayashi, "Function Edition (Part 2) of Third Session of: How to Read SW Hub Catalog for Beginner", Nikkei Open System vol. 72, Nikkei Business Publications, Inc, Mar. 5, 1999, pp. 198 to 207.
Glenn Sullivan, "Establishment of Long Distance San", Unix 4 Magazine vol. 15 No. 4, ASCII Corporation, Apr. 1, 2000, pp. 133 to 137.
"Trial of the NEC Central Research Laboratory for Realizing Information Society that is Friendly to Human and Earth", Business Communication, vol. 47, No. 1, Business Communication Co., Ltd., Jan. 1, 2010, pp. 111 to 113.
Taiwanese Office Action dated May 21, 2014, with English translation.
Chinese Office Action dated Apr. 2, 2014, with English translation.
International Search Report in PCT/JP2011/050016 dated Mar. 29, 2011 (English Translation Thereof).
"OpenFlow Switch Specification Version 1.0.0 (Wire Protocol 0x01) Dec. 31, 2009" http://www.openflowswitch.org/documents/openflow-spec-v1.0.0.pdf.

* cited by examiner

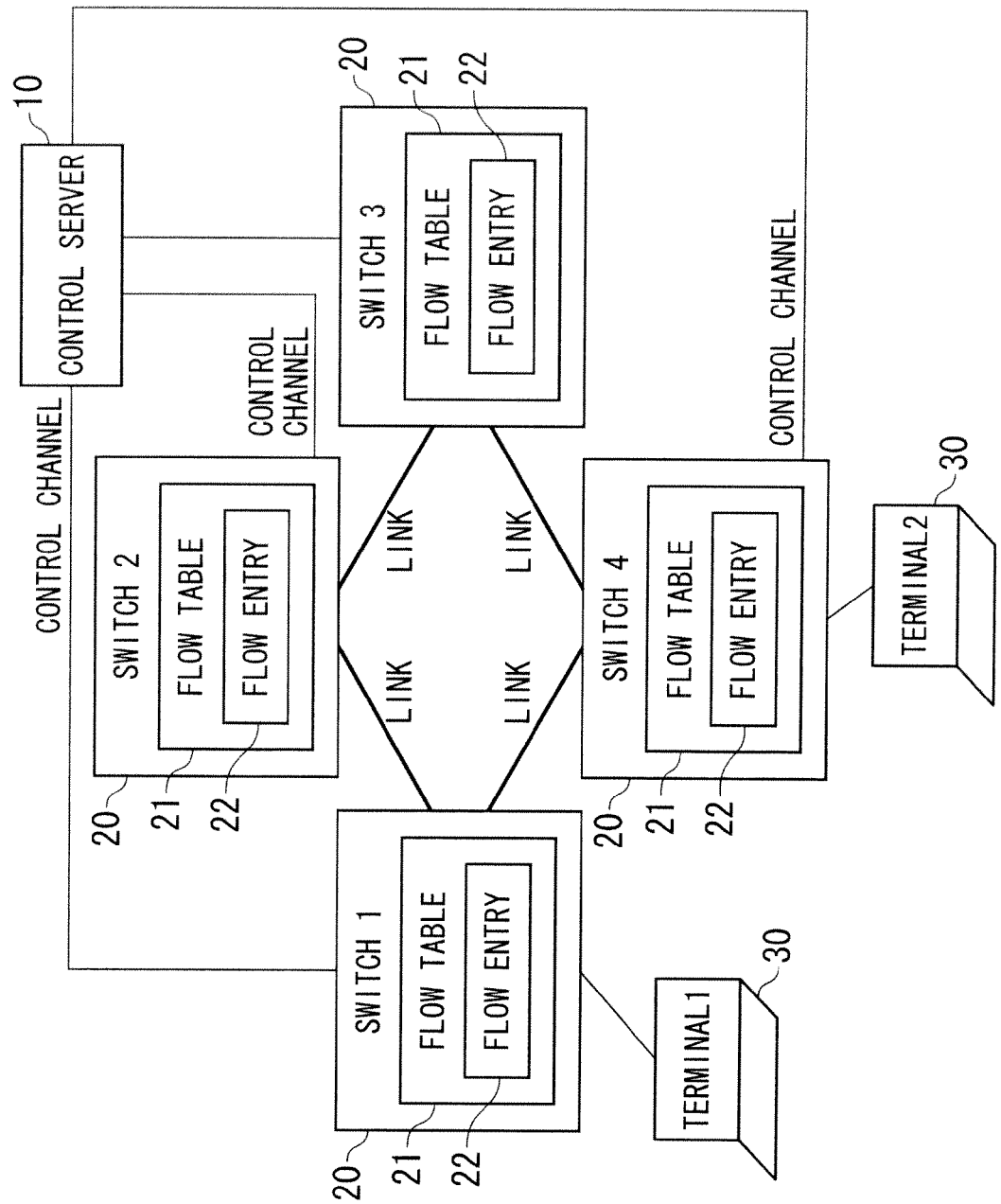

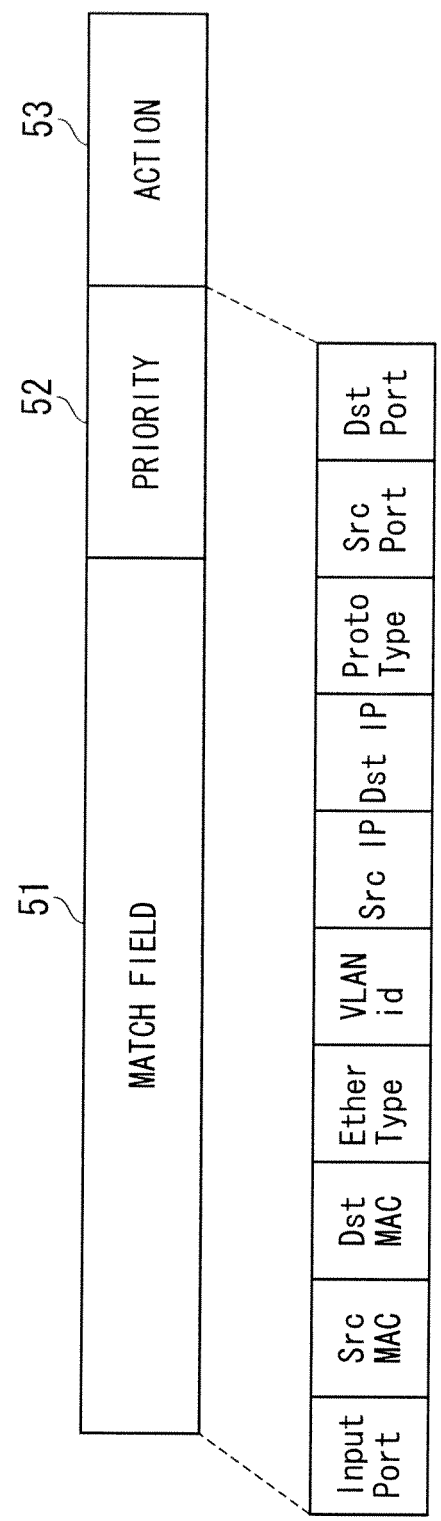

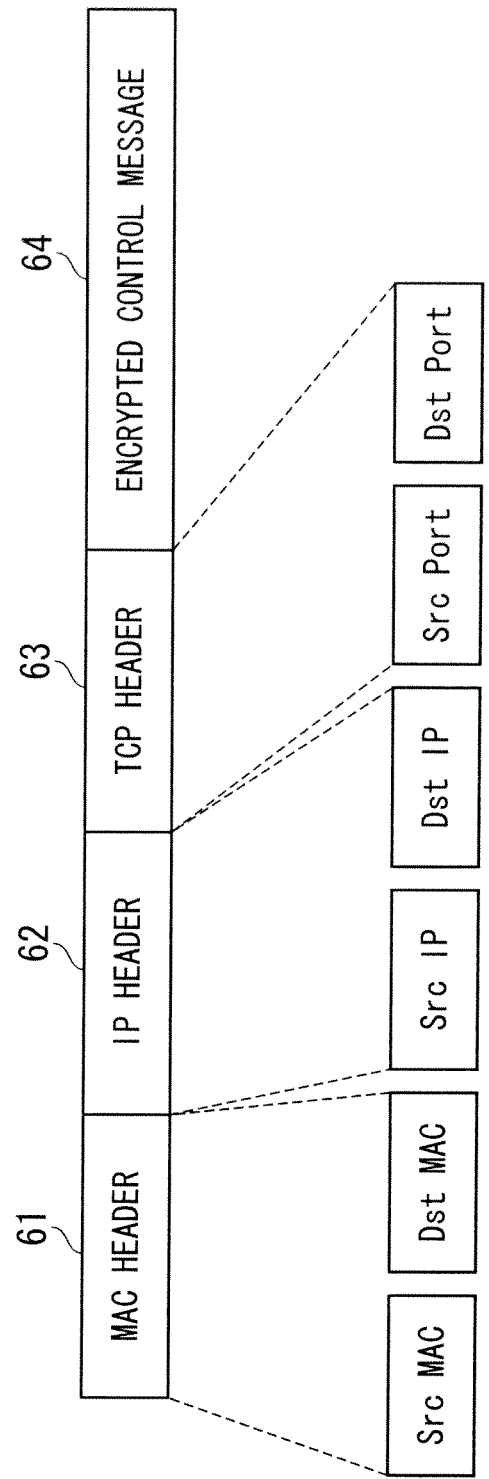

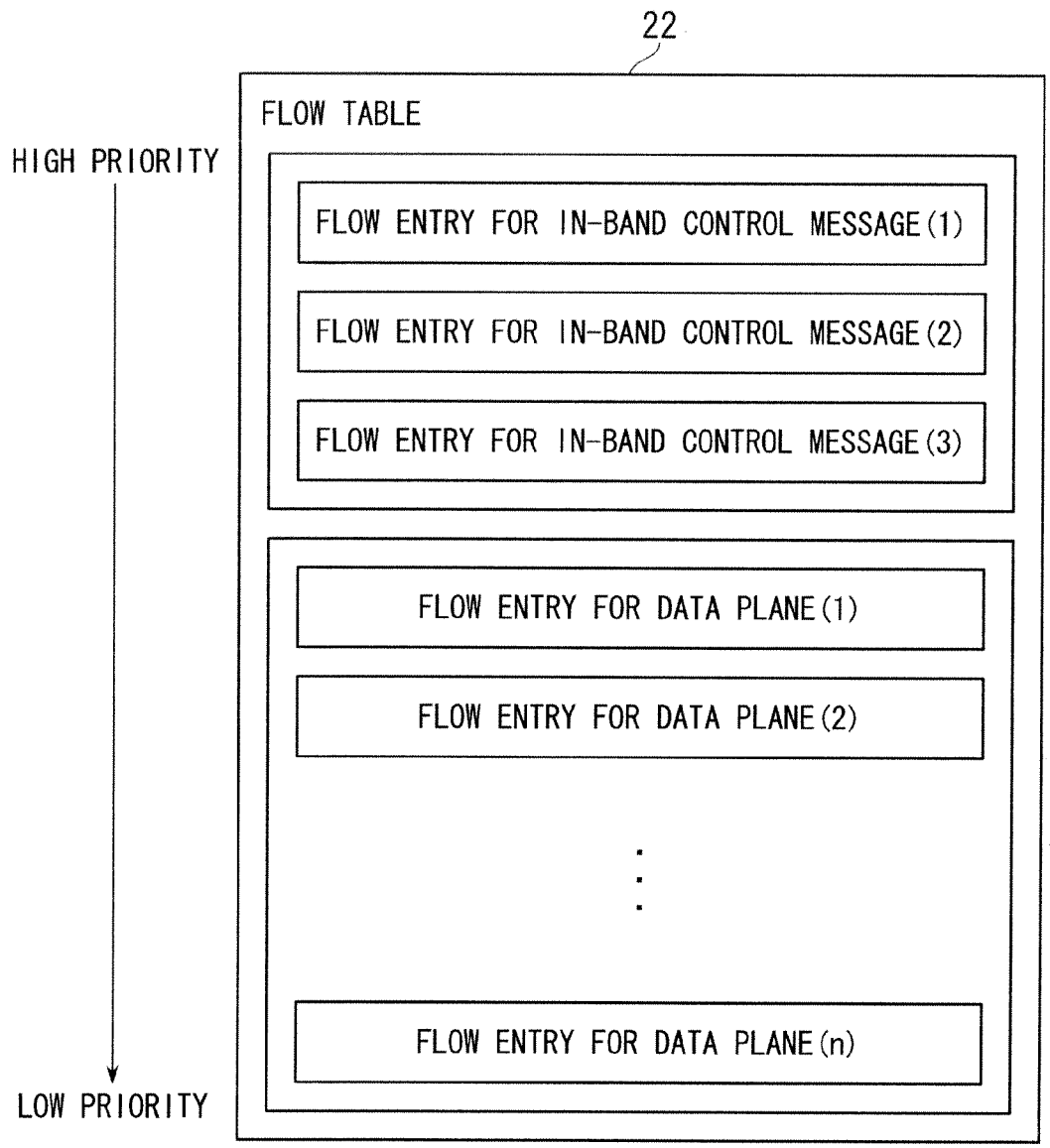

FIG. 7

FLOW ENTRY FOR CONNECTING TO IN-BAND CONTROL SERVER

401 — | Src MAC= ANY | Dst MAC= ANY | Src IP= ANY | Dst IP= CONTROL SERVER IP Address | Src Port= ANY | Dst Port= CONTROL MESSAGE PORT | PRIORITY= MAXIMUM | ACTION= SEND CONTROL MESSAGE TO CONTROL SERVER |

TO IN-BAND CONTROL SERVER & SWITCH

402 — | Src MAC= ANY | Dst MAC= ANY | Src IP= CONTROL SERVER IP Address | Dst IP= TO OWN | Src Port= ANY | Dst Port= CONTROL MESSAGE PORT | PRIORITY= MAXIMUM | ACTION= SEND TO CONTROL MESSAGE PROCESSING UNIT |

IN-BAND CONTROL SERVER & SWITCH RELAY

403 — | Src MAC= ANY | Dst MAC= ANY | Src IP= CONTROL SERVER IP Address | Dst IP= TO OTHER THAN OWN | Src Port= ANY | Dst Port= CONTROL MESSAGE PORT | PRIORITY= HIGH | ACTION= RELAY CONTROL MESSAGE |

FLOW ENTRY FOR IN-BAND CONTROL SERVER

404 — | Src MAC= ANY | Dst MAC= ANY | Src IP= ANY | Dst IP= ANY | Src Port= ANY | Dst Port= CONTROL MESSAGE PORT | PRIORITY= MIDDLE | ACTION= SEND TO OUT-OF-BAND CONTROL SERVER |

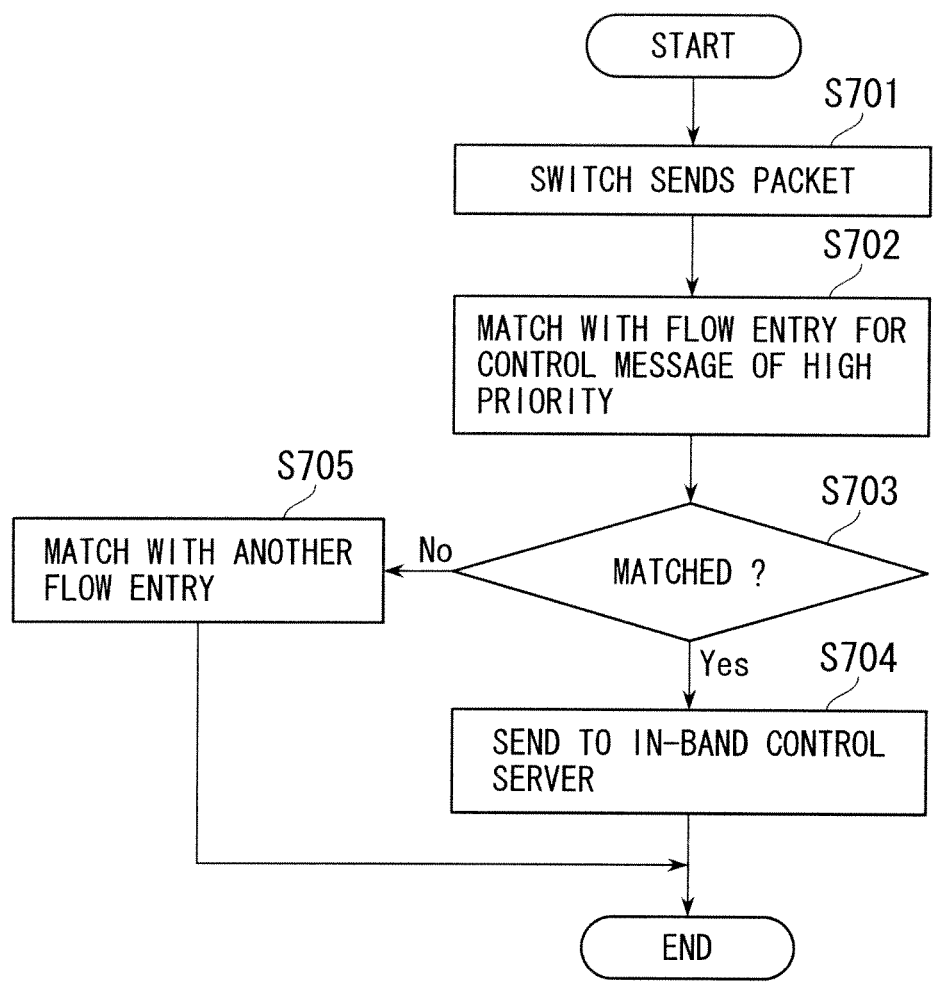

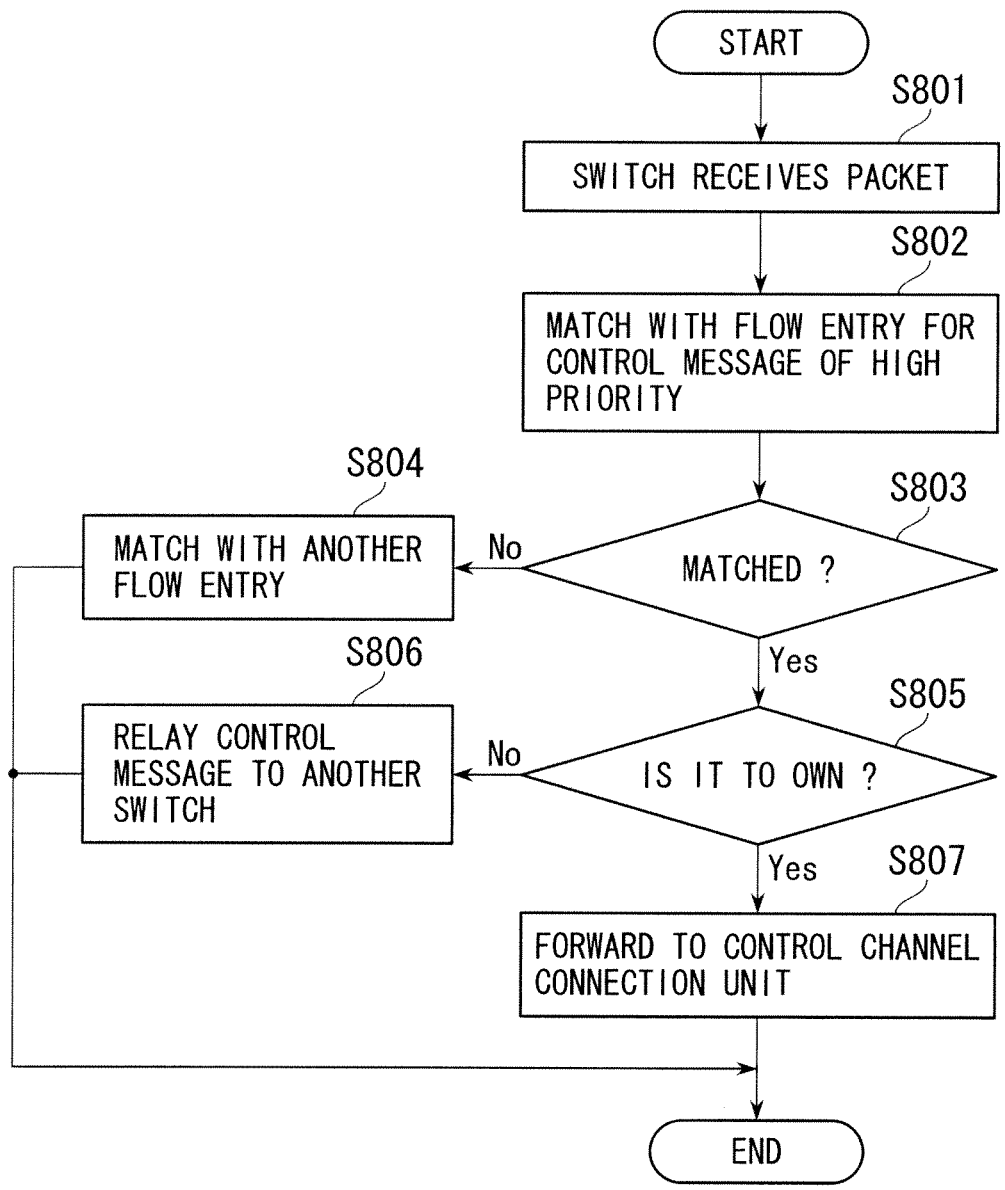

US 9,124,517 B2

NETWORK SYSTEM AND NETWORK REDUNDANCY METHOD

TECHNICAL FIELD

The present invention relates to a network system, and especially relates to a network system where a switch for forwarding a packet and a control server for determining route information are separated from each other.

BACKGROUND ART

In recent years, as one of route control systems in a network system, a route control method that uses the OpenFlow technique, a control protocol for communication devices, has been studied.

In the network system where a route control based on the open flow technique is performed, a control server such as an OFC (OpenFlow Controller) determines the route information, operates a flow table of the switch such as an OFS (OpenFlow Switch) in accordance with the determined route information, and thereby controls the behavior of the switch.

The flow table is a table for registering a flow entry that defines a predetermined process (an action) to be executed to a packet conformed to a predetermined matching condition (a rule). A packet group (a packet series) conformed to the rule is called a flow. The rule of the flow is defined by various combinations using some or all of: a Destination Address; a Source Address; a Destination port; and a Source Port which are included in a header region of each protocol hierarchy of the packet, and can be distinguished. Meanwhile, in the above-mentioned address, a MAC address (Media Access Control Address) and an IP address (Internet Protocol Address) are included. Further, in addition to the above description, information on an Ingress Port also can be used as the rule of the flow.

Details of the OpenFlow technique are described in Non Patent Literatures 1 and 2.

FIGS. 1 and 2 show a network system including: a switch for forwarding a packet; and a control server for determining route information as an example of a network system where the route control is performed on the basis of the OpenFlow technique. FIG. 1 shows a basic configuration of the minimum unit of the network system. FIG. 2 shows a specific configuration example of the network system.

The network system includes a control server 10 and a switch 20.

The control server 10 can determine route information 11, and can register a flow entry 22 on a flow table 21 of the switch 20 via a control channel.

The switch 20 has the flow table 21, and stores the flow entry 22. In addition, the switch 20 forwards a received packet via a link to another switch 20 or to a terminal 30 on the basis of the flow entry 22 stored in the flow table 21.

FIG. 3 shows information registered to the flow entry.

The flow entry 22 retains a match field 51, a priority 52, and an action 53 as the information.

The match field 51 is the information used for matching (collation) between the header information of the packet and the flow entry, and has: the MAC address and the IP address of the source and destination included in the header information; a VLAN ID (Virtual Local Area Network-identifier); and information related to a physical port, an application port, and the like. The priority 52 is the information related to a priority order used for determining the matching order of the flow entry. The action 53 is the information related to a process method (process details) of the packet, and has information defining to send the packet to a specific port or to discard the packet.

FIG. 4 shows the header information of the packet.

The packet retains as the header information: a MAC header 61; an IP header 62; a TCP (Transmission Control Protocol) header 63; an encrypted control message 64. As an example of the control message 64, a "Flow Mod" message for registering the entry from the controller to the flow table of the switch, the message being one of the Open Flow Protocol Messages, and the like can be considered.

The MAC header 61 has the source MAC address (the Src MAC in FIG. 4) and the destination MAC address (the Dst MAC in FIG. 4). The IP header 62 has the source IP address (the Src IP in FIG. 4) and the destination IP address (the Dst IP in FIG. 4). The TCP header 63 has the source port (the Src Port in FIG. 4) and the destination port (the Dst Port in FIG. 4).

The switch 20 refers to the header information extracted from the packet header of the received packet and to the match field 51 of the flow entry, and when the information on the same items included in them conform by the matching respectively, the switch 20 determines the action 53 of the flow entry as the action to the packet.

In FIG. 5, regarding the flow entry in each of the flow tables, the matching order is determined on the basis of the priority of each flow entry.

As described above, in the above-described network system, the switch used as the packet forwarding means and the control server used as the route information determination means are separated from each other, a configuration where one control server determines the route information of the plurality of switches is realized, and the switch and the control server are connected by a control channel. In this case, in order to prevent the communication between the switch and the control server from delaying and being interrupted, it is desired that the control channel is a dedicated line; however, a dedicated port for the switch and a dedicated link for the network are required to use the control channel as the dedicated line, and thus availability and expandability are restricted. In addition, in the case where the dedicated line of the control channel is disconnected, the switch fails to receive the control information.

As a related technique, Patent Literature 1 (JP2000-078194A) discloses a network system. In the related technique, a switch composing the network includes a plurality of connection ports, and to the ports, a transmission path, an end system, and a network server each composing the network are connected.

In addition, Patent Literature 2 (JP2003-273907A) discloses an autonomous system, a communication control method, a server, and a router. In the related technique, the autonomous system is configured by including: a plurality of BGP routers having a function for performing communication based on a BGP (Boarder Gateway Protocol) mutually with another autonomous system; a single server for intensively controlling the BGP communication due to the BGP router; and a router for relaying the communication between the server and the BGP router without having the communication function based on the BGP. The BGP router and the router can change the route information of an IP packet in itself in accordance with an order from the server.

Moreover, Patent literature 3 (JP2007-251344A) discloses a wireless communication device and a wireless communication method. In the related technique, even in the case where upstream control information included in the control information cannot be obtained because of occurrence of an error in a control channel, the upstream control information is placed in-band in a data channel, and accordingly a frame for the upstream transmission is created by using the upstream control information placed in-band.

CITATION LIST

Patent Literature

[PTL 1] Patent literature 1: Japanese Patent Application Publication JP2000-078194A
[PTL 2] Patent literature 2: Japanese Patent Application Publication JP2003-273907A
[PTL 3] Patent literature 1: Japanese Patent Application Publication JP2007-251344A Non-Patent Literature

[NPTL 1] Non patent literature 1: "The OpenFlow Switch Consortium"<http://www.openflowswitch.org/>
[NPTL 2] Non patent literature 2: "OpenFlow Switch Specification Version 1.0.0 (Wire Protocol 0x01) Dec. 31, 2009"<http://www.openflowswitch.org/documents/openflow-spec-v1.0.0.pdf>

SUMMARY OF INVENTION

A mechanism is provided, by which a switch has an ability to connect not only the out-of-band control server but also other control servers such as the in-band control server, and the control channel acquires redundancy by the out-of-band control server and the in-band control server.

A network system according to the present invention includes: a switch; an out-of-band control server; and an in-band control server. The switch forwards a packet. The out-of-band control server sends a control message to the switch via an out-of-band control channel to determine route information. The in-band control server sends a control message to the switch via an in-band control channel to determine route information. Further, the out-of-band control server registers a flow entry for control message by which the switch is defined to forward a control message to the in-band control server. Here, each of the switch, the out-of-band control server, and the in-band control server is a computer.

In a network redundancy method according to the present invention, a packet is forwarded by a switch. A control message is sent from an out-of-band control server to the switch via an out-of-band control channel to determine route information. A control message is sent from an in-band control server to the switch via an in-band control channel to determine route information. Further, a flow entry for control message by which the switch is defined to forward a control message is registered from the out-of-band control server to the in-band control server.

A program according to the present invention is a program for making a computer which functions as each of the switch, the out-of-band control server, and the in-band control server execute the above-mentioned network redundancy method. The program according to the present invention is able to be stored in a storage device or a storage medium.

In a network system in which a switch for forwarding packets and a control server which determines route information are separated, the redundancy by the in-band control channel is achieved.

BRIEF DESCRIPTION OF DRAWINGS

FIG. 2 is a conceptual diagram showing a specific configuration example of the network system;

FIG. 3 is a diagram showing an example of information registered to a flow entry;

FIG. 4 is a diagram showing an example of header information of a packet;

FIG. 5 is a diagram showing an example of a matching order based on priority of the flow entry;

FIG. 7 is a diagram showing an example of a flow entry for control message, the flow entry being registered to a flow table of the switch;

FIG. 17 is a flowchart showing an operation in matching of the flow entry for control message; and FIG. 18 is a flow chart showing an operation in extraction of the control message from a packet group.

BEST MODE FOR CARRYING OUT THE INVENTION

First Embodiment

Referring to attached drawings, a first embodiment of the present invention will be explained below.
[Basic Configuration]

Figure 6A:
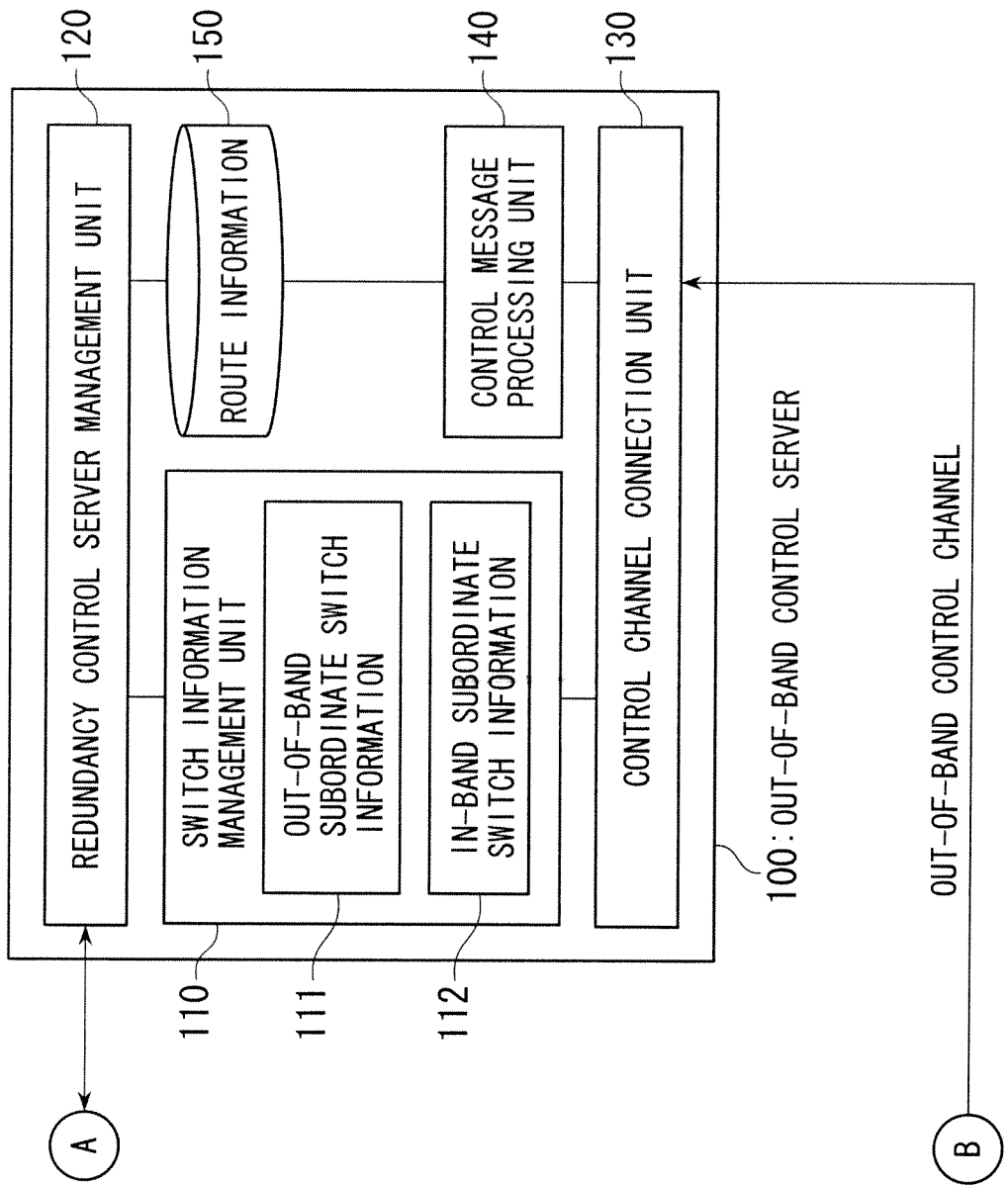
FIG. 6A is a block diagram showing a basic configuration of the network system of the present invention.
Figure 6B:
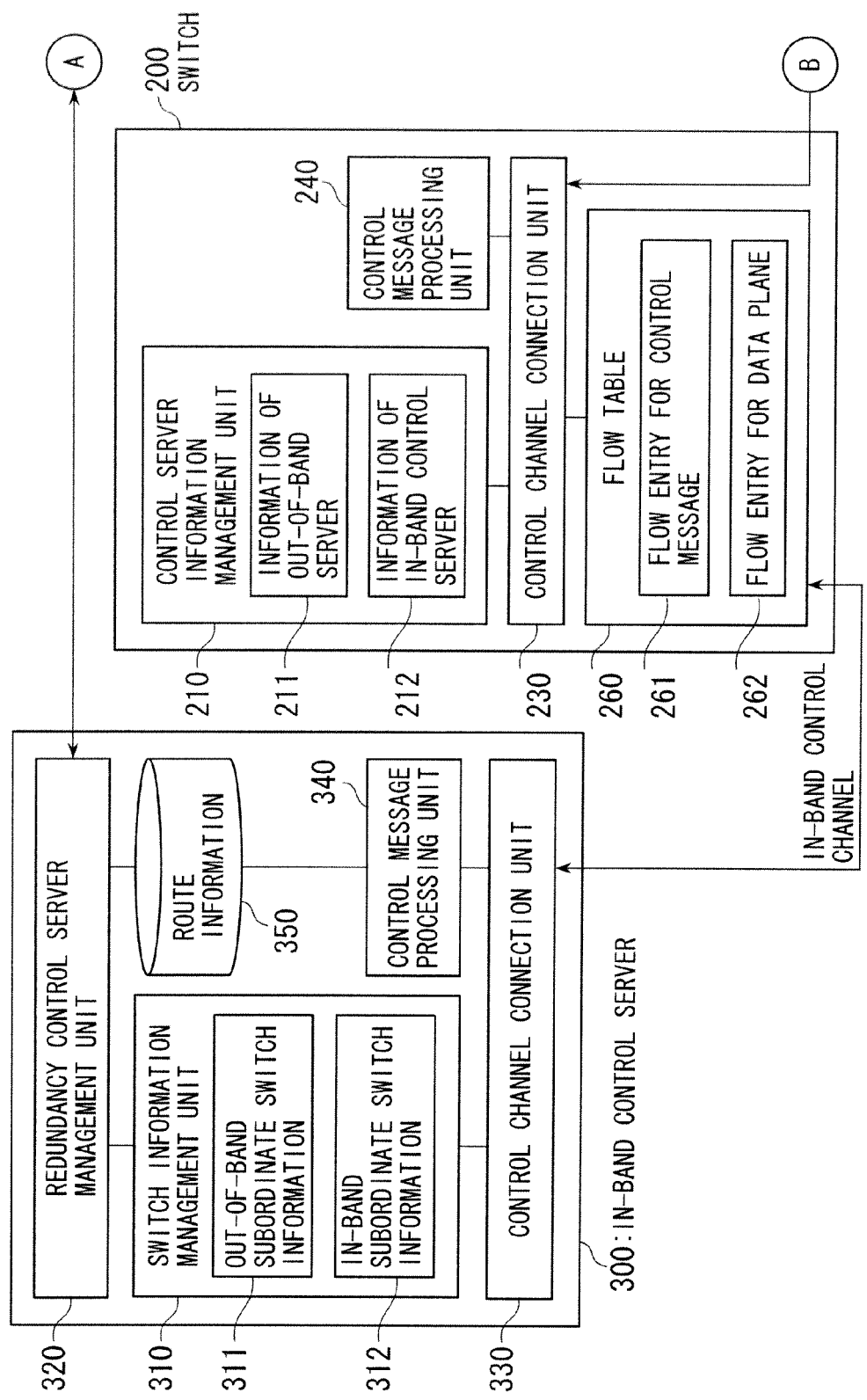
FIG. 6B is a block diagram showing a basic configuration of the network system of the present invention.

As shown in FIG. 6A and FIG. 6B, a network system of the present invention includes an out-of-band control server 100, a switch 200, and an in-band control server 300.

The out-of-band control server 100 has a switch information management unit 110, a redundancy control server management unit 120, a control channel connection unit 130, a control message processing unit 140, and route information 150.

The switch 200 has a control server information management unit 210, a control channel connection unit 230, a control message processing unit 240, and a flow table 260.

The in-band control server 300 has a switch information management unit 310, a redundancy control server management unit 320, a control channel connection unit 330, a control message processing unit 340, and route information 350.

The out-of-band control server 100, the switch 200, and the in-band control server 300 have functions to control each device inside and outside a computer, to generate and process data, and to execute a program. For example, the case where: the out-of-band control server 100 is outside a route for forwarding a packet; and the switch 200 and the in-band control server 300 are on the route for forwarding the packet can be considered. On this occasion, the out-of-band control server 100 may send only a control message to the switch in the out-of-band method, and the in-band control server 300 may send the control message and data to the switch in the in-band method.

The switch information management unit 110, the redundancy control server management unit 120, the control server information management unit 210, the switch information management unit 310, and the redundancy control server management unit 320 have a function for retaining packets.

The redundancy control server management unit 120, the control channel connection unit 130, the control channel connection unit 230, the redundancy control server management unit 320, and the control channel connection unit 330 have a function for sending and receiving the packet to and from the outside via the network.

The control message processing unit 140, the control message processing unit 240, and the control message processing unit 340 have functions for generating and processing the control message.

[Exemplification of Hardware]

As examples of the out-of-band control server 100 and the in-band control server 300, a computer such as a PC (Personal Computer), an appliance, a work station, a main frame, and a super computer are assumed. It is preferred that the out-of-band control server 100 and the in-band control server 300 basically have a same configuration.

As an example of the switch 200, an OpenFlow switch is assumed. As an example of apparatuses usable for the OpenFlow switch, a relay apparatus such as a router and a switching hub, a relaying computer such as a gateway, a proxy, a firewall, and a load balancer, and the like can be considered. For example, the switch 200 may be a multi-layer switch. The multi-layer switch is further minutely classified every layer of a supported OSI reference model. Major classifications are a layer3 switch for reading data of a network layer (the 3rd layer), a layer4 switch for reading data of a transport layer (the 4th layer), and a layer7 switch (an application switch) for reading data of an application layer (the 7th layer).

The out-of-band control server 100, the switch 200, and the in-band control server 300 may be a Virtual Machine (VM) structured on a physical machine.

As examples of hardware for realizing the data process function and the program execution function of: the out-of-band control server 100, the switch 200, the in-band control server 300, the control message processing unit 140, the control message processing unit 240, and the control message processing unit 340, a CPU (Central Processing Unit), a microprocessor, a microcontroller, a semiconductor integrated circuit (Integrated Circuit (IC)) having the equivalent function, and the like can be considered.

As examples of hardware for realizing: the data retention function of the switch information management unit 110, the redundancy control server management unit 120, the control server information management unit 210, the switch information management unit 310, and the redundancy control server management unit 320, and the data retention function for retaining the route information 150, the flow table 260, and the route information 350, a semiconductor storage device such as a RAM (Random Access Memory), a ROM (Read Only Memory), an EEPROM (Electrically Erasable and Programmable Read Only Memory), and a flash memory, an auxiliary storage device such as an HDD (Hard Disk Drive) and an SSD (Solid State Drive), or a removable disk and a storage medium such as a DVD (Digital Versatile Disk) and an SD memory card (Secure Digital memory card) can be considered. Meanwhile, the above-mentioned hardware for realizing the data retention function is not limited to a storage device incorporated in the computer body, and may be a peripheral apparatus (an external HDD and the like), a storage device installed in an external server (a Web server, a file server, and the like), a DAS (Direct Attached Storage), a FC-SAN (Fiber Channel-Storage Area Network), a NAS (Network Attached Storage), or an IP-SAN (IP-Storage Area Network).

As examples of hardware for realizing the communication function of: the redundancy control server management unit 120; the redundancy control server management unit 320; the control channel connection unit 130; the control channel connection unit 230; and the control channel connection unit 330, a network adapter such as a NIC (Network Interface Card), a communication device such as an antenna, a communication port such as a connection port (a connector), and the like can be considered. In addition, as examples of the network, the Internet, a LAN (Local Area Network), a wireless LAN, a WAN (Wide Area Network), the backbone, a cable television (CATV) line, a landline phone network, a mobile phone network, the WiMAX (IEEE 802.16a), the 3G (3rd Generation), a lease line, the IrDA (Infrared Data Association), the Bluetooth (a registered trademark), a serial communication line, a data bus, and the like can be considered.

However, the embodiments are not limited the above-mentioned examples practically.

[Details of Configuration]

The out-of-band control server 100 registers, as out-of-band subordinate switch information 111, information on the switch (a switch ID and the like) that is preliminarily managed by itself to the switch information management unit 110. In addition, the out-of-band control server 100 registers information on other control servers existing on the network. With use of the redundancy control server management unit 120, the out-of-band control server 100 inquires other control server whether or not to be able to provide the service as the in-band control server 300. In the case where other control server notified that the service provision is available, the out-of-band control server 100 uses a certification received from the other side (other control server), and establishes an encrypted communication route between the out-of-band control server 100 and the in-band control server 300 with employment of the other control server as the in-band control server 300. Moreover, with use of the control message processing unit 140, the out-of-band control server 100 generates a control message related to the flow entry registration and the like on the basis of the route information 150, and sends the control message to the switch 200 via the control channel connection unit 130.

Since receiving the control message mainly from information 211 on the out-of-band control server, the switch 200 registers at least the information 211 on the out-of-band control server 211 to the control server information management unit 210. With use of the control channel connection unit 230, the switch 200 sends a connection request to the already-known out-of-band control server 100. The switch 200 creates a common key (a shared key) between the switch 200 and the out-of-band control server 100 on the basis of the certification received from the out-of-band control server 100, and establishes the encrypted communication route and the outof-band control channel. Here, the network for data forwarding of the switch 200 used as a link is a different network from the network between the switch 200 used as the out-of-band control channel and the out-of-band control server 100. The switch 200 uses the out-of-band control channel as a communication route dedicated to the control message.

When the out-of-band control channel has been established between the switch 200 and the out-of-band control server 100, information 212 on the in-band control server 300 is notified from the out-of-band control server 100 to the subordinate switch 200, and the flow entry that defines the packet forwarding to the in-band control server 300 is registered to the flow table 260 of the switch 200. The flow entry serves as a flow entry 261 for control message, and is set so as to be the highest priority and to avoid the aging out from the flow table inside the switch 200. That is, to the flow table 260 of the subordinate switch 200, the out-of-band control server 100 registers the flow entry showing that a packet is forwarded to the in-band control server 300 to inquire the route information. In the case where the in-band control server 300 is on the packet forwarding route, the in-band control server 300 serves as a destination of the packet and also as the control server, for the switch 200.

The switch 200 extracts a packet of the control message mixed with other communication data by using: the header information of the received packet; and the flow entry for control message, and thereby judging whether it is the communication addressed to itself or the relay of the control message. In addition, the switch 200 uses the header information of the received packet and the flow entry for control message also in determination of a route for communication between the switch 200 and the in-band control server 300.

FIG. 7 shows an example of the flow entry 261 for control message registered in the flow table 260 of the switch 200. Here, as the example of the flow entry 261 for control message, flow entries 401 to 404 are shown. The flow entry 401 is a flow entry for connection to the in-band control server 300. The flow entry 402 is a flow entry addressed from the in-band control server 300 to the switch 200. The flow entry 403 is a flow entry for relay from the in-band control server 300 to the switch 200. The flow entry 404 is a flow entry for the in-band control server 300.

With use of the out-of-band control channel, the out-of-band control server 100 registers the flow entries 401 to 404 for control message to the flow table 260 of the subordinate switch 200.

The out-of-band control server 100 registers, to the flow table 260 of the subordinate switch 200, data that records: the source IP address (Src IP) of the in-band control server; and the TOP port for control message (Src Port) in a match field of the flow entry 401 for connection to the in-band control server 300. The switch 200 specifies a packet to the in-band control server 300 by preferentially matching information extracted from the packet header with the match field of the flow entry, and sends the packet to the in-band control server 300. On the contrary, in the case of specifying a packet from the in-band control server 300, since the Source IP address (Src IP) of the in-band control server 300 and the TCP port (Src Port) for control message of the source are recorded in the match fields of the flow entries 402 and 403, the switch 200 can judge whether it is the communication addressed to itself or the relay of the control message on the basis of the packet of the mixed communication data.

Figure 8:
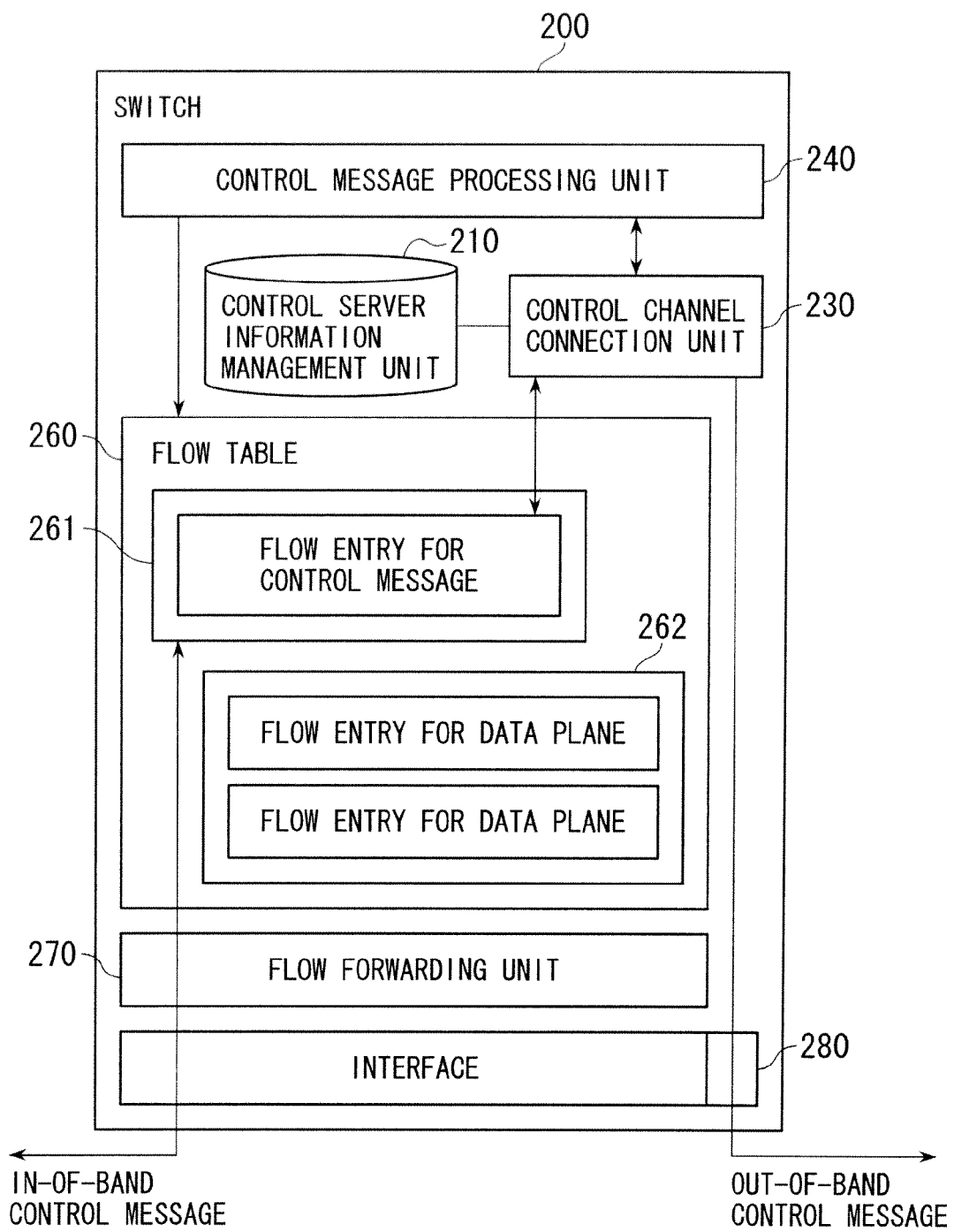
FIG. 8 is a block diagram showing a detailed configuration of an inside of the switch.

FIG. 8 shows details of an internal configuration of the switch 200. Here, configurations of: the internal flow table 260 of the switch 200, the flow entry 261 for control message, and the flow entry 262 for data plane are especially shown.

Meanwhile, a flow forwarding unit 270 newly shown in FIG. 8 receives a data traffic where a packet of the control message and other packets are mixed, and forwards each of the packets on the basis of the flow entry in the flow table 260. In addition, the interface 280 has: a dedicated port for the out-of-band control channel, and a universal port for the in-band control channel.

In FIG. 8, the control message via the out-of-band control channel is directly sent to the control channel connection unit 230 via a dedicated port of the interface 280 without matching with the flow entry in the flow table 260. However, the control message via the in-band control channel is mixed with other packets and reaches the flow forwarding unit 270 of the switch 200 via a universal port of the interface 280. On this occasion, with use of the high priority flow entry 261 for control message, the switch 200 specifies the control message, and judges whether to forward the control message to the control channel connection unit 230 addressed to itself or to relay the control message.

With use of: information (IP address and the like) on the in-band control server 300 existing in the control server information management unit 210; and the control message processing unit 240, the switch 200 requests the in-band control server 300 to connect with via the control channel connection unit 230. The in-band control server 300 certifies the switch 200, and sends the certification to the permitted switch 200. The switch 200 creates a common key between the switch 200 and the in-band control server 300 from the certification received from the in-band control server 300, and establishes the encrypted communication route and the in-band control channel. The in-band control server 300 stores the information on the switch in the switch information management unit 310 as in-band subordinate switch information 312.

The switch 200 monitors statuses of the out-of-band control server 100 and of the in-band control server 300, simultaneously receiving the control message related to the flow entry registration and the like based on the route information mainly from the out-of-band control server 100. In the case where abnormality of the status of the out-of-band control server 100 is detected, the switch 200 can instantly switch the server to the in-band control server 300.

Figure 9:
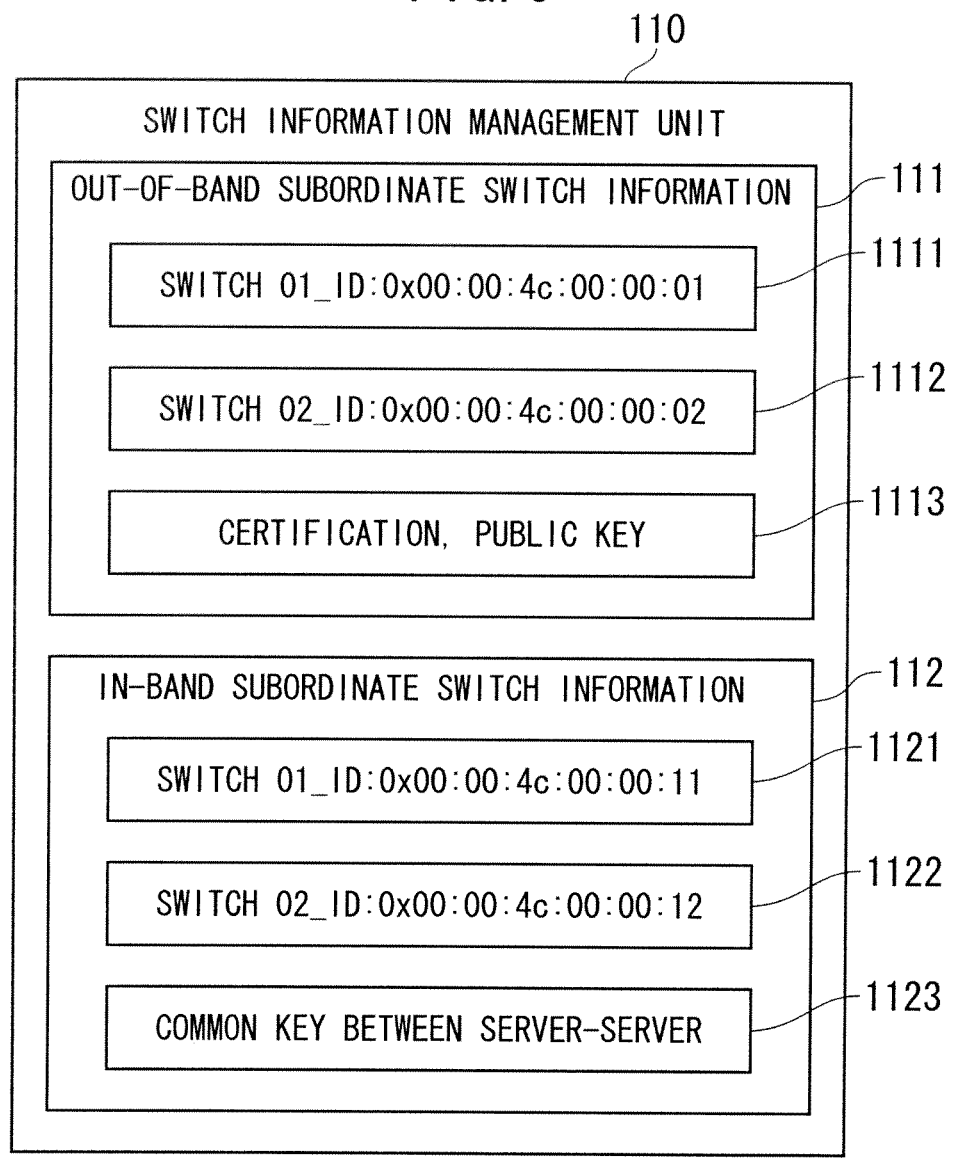
FIG. 9 is a diagram showing an example of switch information registered to a switch information management unit.

FIG. 9 shows an example of the switch information registered to the switch information management unit 110 and the switch information management unit 310. Here, the switch information registered to the switch information management unit 110 will be explained.

The switch information management unit 110 has the out-of-band subordinate switch information 111 and in-band subordinate switch information 112. The out-of-band subordinate switch information 111 includes switch IDs 1111 and 1112 and a certification/public key 1113. The in-band subordinate switch information 112 includes switch IDs 1121 and 1122 and a common key between server-server 1123.

Figure 10:
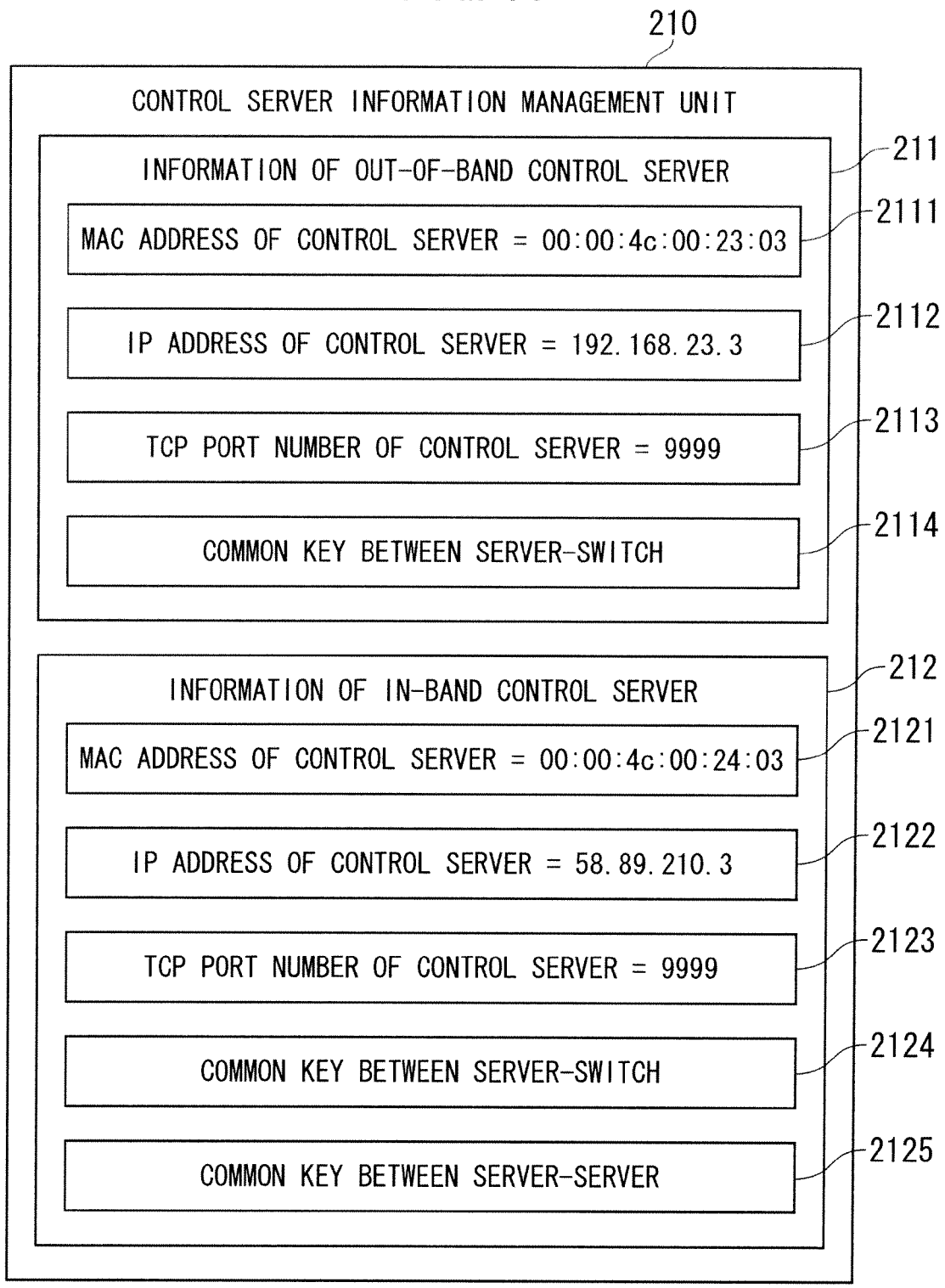
FIG. 10 is a diagram showing an example of control server information registered to a control server information management unit.

FIG. 10 shows an example of the control server information registered to the control server information management unit 210.

The control server information management unit 210 has: the information 211 on the out-of-band control server, and the information 212 on the in-band control server. The information 211 on the out-of-band control server includes: a MAC address 2111 of the control server, an IP address 2112 of the control server, a TCP port number 2113 of the control server, and a common key between server-switch 2114. The information 212 on the in-band control server includes: a MAC address 2121 of the control server, an IP address 2122 of the control server, a TCP port number 2123 of the control server, and a common key between server-switch 2124.

Then, using time charts shown in FIG. 11 to FIG. 18, operations of the server and so on in the network system of the present invention will be explained.

[Operation on Out-of-Band Control Server Side]

Figure 11:
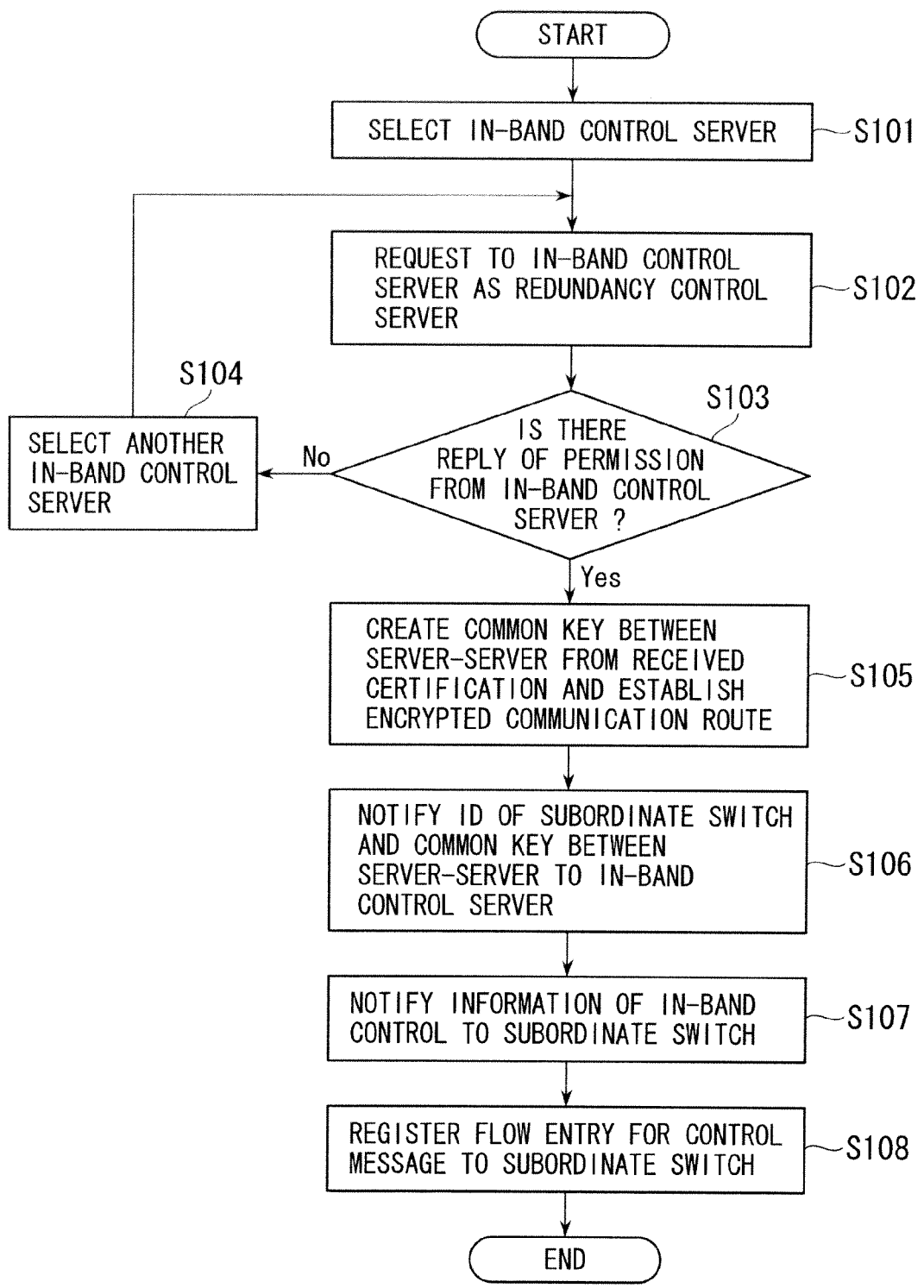
FIG. 11 is a flowchart showing an operation on a side of an out-of-band control server.

FIG. 11 shows an operation on a side of the out-of-band control server 100.

(1) Step S101

The out-of-band control server 100 selects the in-band control server 300.

(2) Step S102

The out-of-band control server 100 requests to connect to the selected in-band control server 300. Here, the out-of-band control server 100 requests the selected in-band control server 300 to provide the service as the redundancy control server.

(3) Step S103

The out-of-band control server 100 confirms whether or not a reply of permission is issued from the in-band control server 300. Here, in the case of receiving the certification from in-band control server 300, the out-of-band control server 100 judges that the reply of permission is issued from the in-band control server 300.

(4) Step S104

In the case where the reply of permission is not issued from the in-band control server 300 (No at step S103), the out-of-band control server 100 selects another in-band control server 300, and requests again to connect to the selected in-band control server 300.

(5) Step S105

In the case where the reply of permission is issued from the in-band control server 300 (Yes at step S103), the out-of-band control server 100 creates a common key with use of the certification from the in-band control server 300, and establishes the encrypted communication route between the out-of-band control server 100 and the in-band control server 300.

(6) Step S106

The out-of-band control server 100 notifies: information on the subordinate switch (a switch ID); and the created common key of the in-band control server 300.

(7) Step S107

The out-of-band control server 100 notifies information on the in-band control server 300 of the subordinate switch 200.

(8) Step S108

The out-of-band control server 100 registers the flow entry 261 for control message to the flow table 260 of the switch 200.

[Operation on in-Band Control Server Side]

Figure 12:
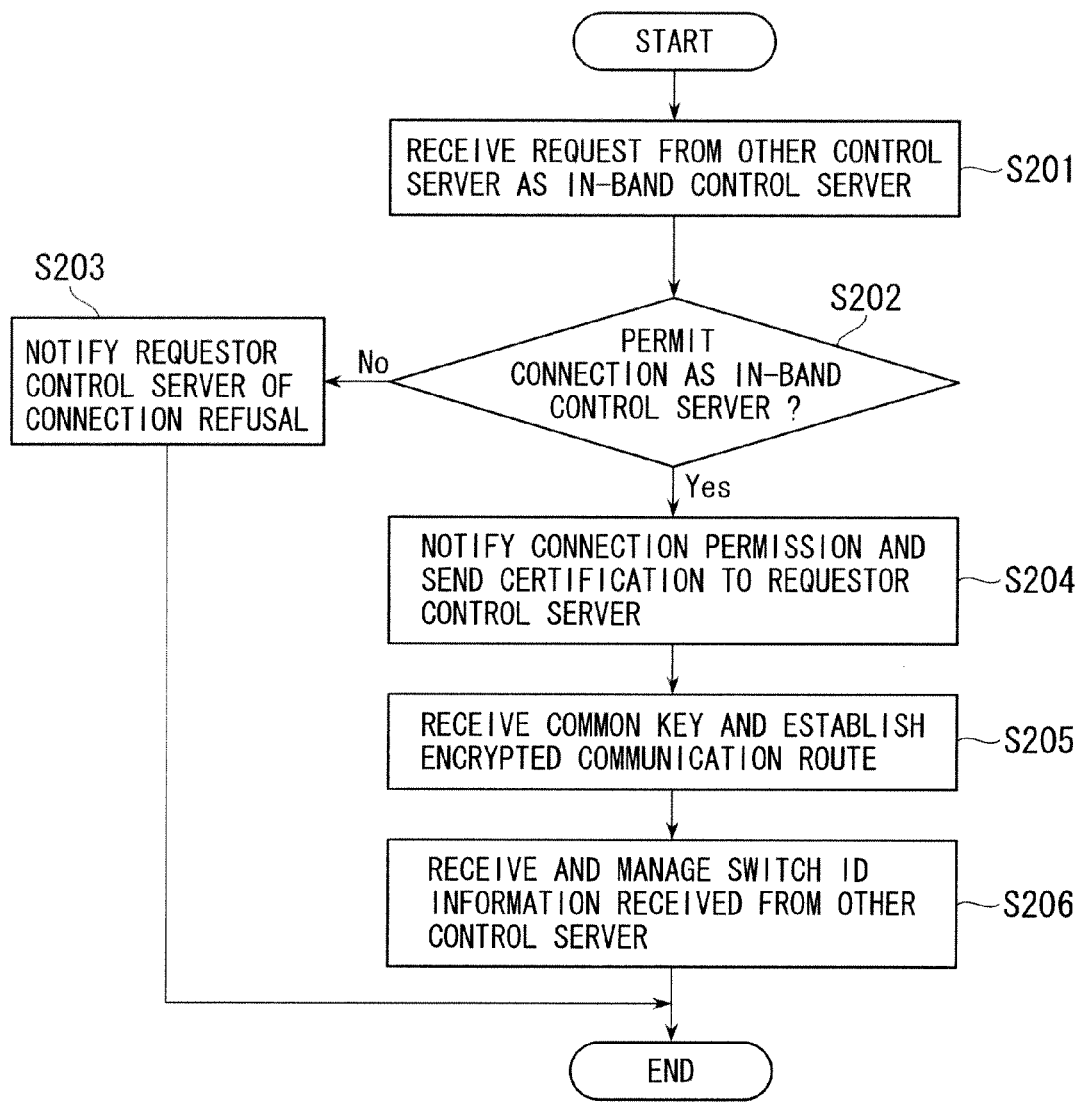
FIG. 12 is a flowchart showing an operation on a side of an in-band control server.

FIG. 12 shows an operation on a side of the in-band control server 300.

(1) Step S201

The in-band control server 300 receives a connection request as the in-band control server 300 from other control servers. Here, the requestor control server is the out-of-band control server 100. The in-band control server 300 receives a service provision request as the redundancy control server from the out-of-band control server 100.

(2) Step S202

The in-band control server 300 judges whether or not to permit the requestor control server to connect as the in-band control server 300.

(3) Step S203

In the case of not permitting the requestor control server to connect as the in-band control server 300, the in-band control server 300 notifies the requestor control server of the connection refusal.

(4) Step S204

In the case of permitting the requestor control server to connect as the in-band control server 300, the in-band control server 300 notifies the requestor control server of the connection permission, and sends the certification.

(5) Step S205

The in-band control server 300 receives the common key from the requestor control server, and establishes an encrypted communication route and a server-to-server communication route. Here, the in-band control server 300 receives the common key created by the out-of-band control server 100 from the out-of-band control server 100, and establishes the encrypted communication route between the out-of-band control server 100 and the in-band control server 300.

(6) Step S206

In addition, the in-band control server 300 stores information on the switch received from the other-side control server. Here, the in-band control server 300 receives the switch ID showing the subordinate switch 200 from the out-of-band controls server 100, and manages the switch ID. Meanwhile, the in-band control server 300 may receive the common key and the information on switch (the switch ID) at the same timing.

[Establishment of Out-of-Band Control Channel]

Figure 13:
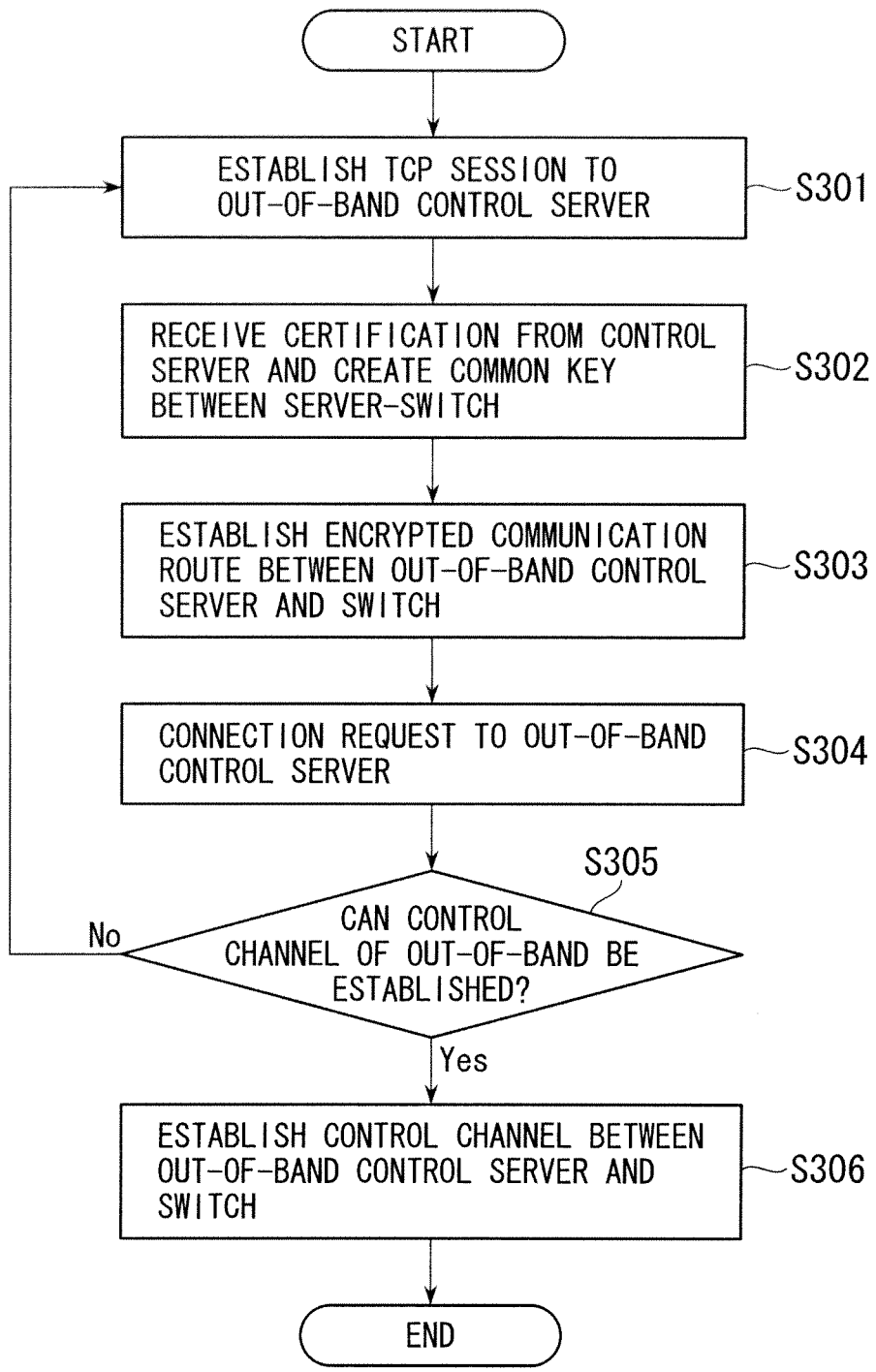
FIG. 13 is a flowchart showing an operation in establishment of an out-of-band control channel.

FIG. 13 shows an operation in: confirming the TCP session with respect to the out-of-band control server 100 whose switch 200 is already known; creating the public key with use of the certification received from the server; and establishing an encrypted communication route and an out-of-band control channel.

(1) Step S301

The switch 200 establish the TCP session with respect to the already-known out-of-band control server 100.

(2) Step S302

The switch 200 receives the certification from the out-of-band control server 100, and creates the common key between the out-of-band control server 100 and the switch 200.

(3) Step S303

The switch 200 establishes the encrypted communication route between the out-of-band control server 100 and the switch 200.

(4) Step S304

The switch 200 sends a connection request to the out-of-band control server 100.

(5) Step S305

The switch 200 confirms whether or not the out-of-band control channel can be established. Here, when a reply of connection permission is issued from the out-of-band control server 100, the switch 200 judges that the out-of-band control channel can be established. In the case where the out-of-band control channel cannot be established, the switch 200 repeats the operation from the beginning.

(6) Step S306

In the case where the out-of-band control channel can be established, the switch 200 establishes the out-of-band control channel between the out-of-band control server 100 and the switch 200.

[Establishment of in-Band Control Channel]

Figure 14:
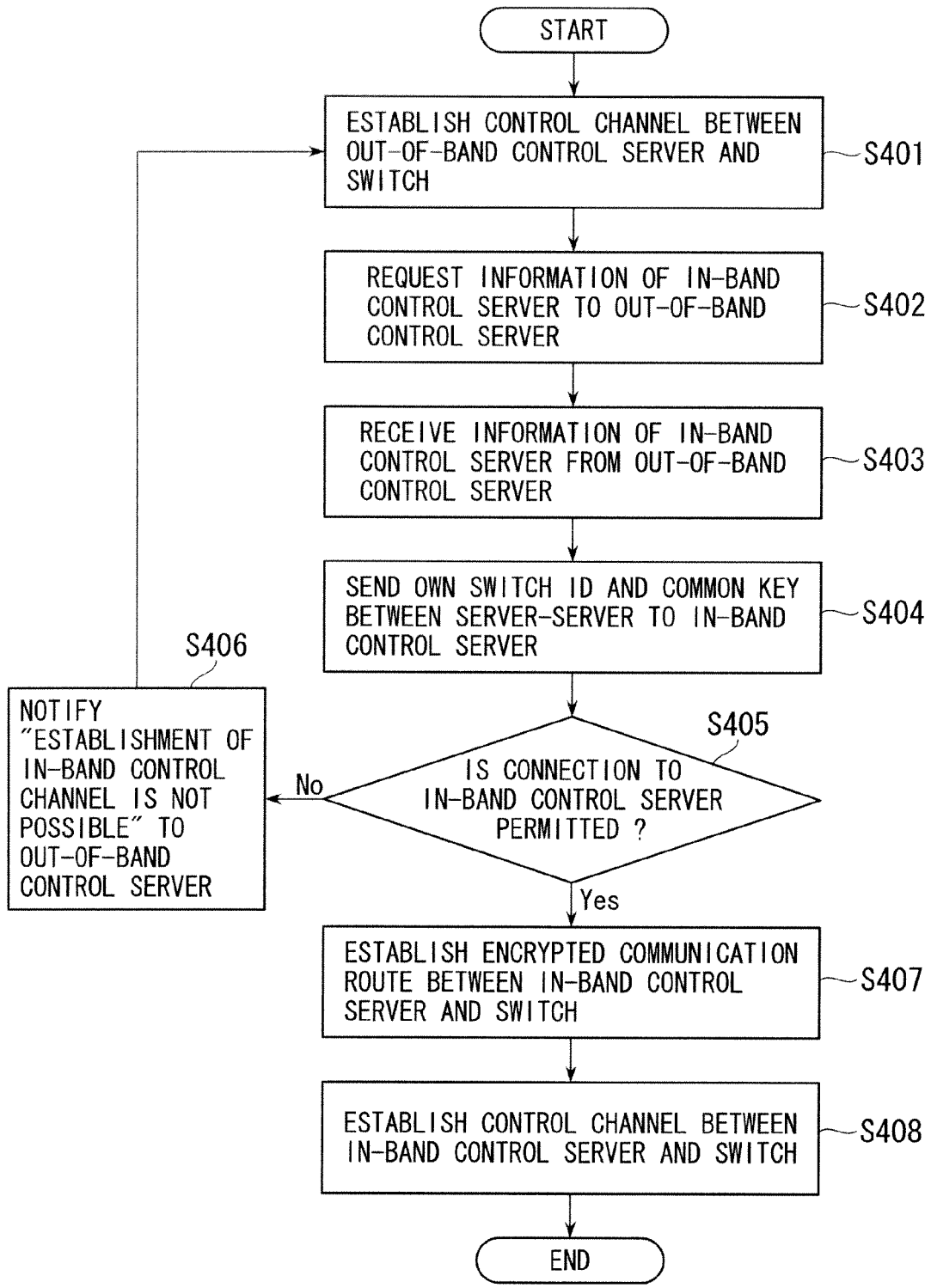
FIG. 14 is a flowchart showing an operation in establishment of an in-band control channel.

FIG. 14 shows an operation in establishing the in-band control channel after the switch 200 established the out-of-band control channel.

(1) Step S401

The switch 200 establishes the out-of-band control channel between the switch 200 and the out-of-band control server. This procedure is shown in FIG. 13.

(2) Step S402

After the establishment of the out-of-band control channel, the switch 200 requests the information on the in-band control server 300 and the common key between the out-of-band control server 100 and the in-band control server 300 to the out-of-band control server 100.

(3) Step S403

The switch 200 receives information on the proposed in-band control server 300 from the out-of-band control server 100.

(4) Step S404

The switch 200 sends the own switch ID and the common key between the out-of-band control server 100 and the in-band control server 300 to the proposed in-band control server 300, and requests the in-band control server 300 to connect with.

(5) Step S405

The switch 200 confirms whether or not the connection to the in-band control server 300 is permitted. Here, in the case of receiving a reply of connection permission from the in-band control server 300, the switch 200 judges that the connection to the in-band control server 300 is permitted.

(6) Step S406

In the case of not receiving the reply of connection permission from the in-band control server 300 (No at Step S405), the switch 200 notifies the out-of-band control server 100 that "impossible to establish the in-band control channel", and requests the information on another in-band control server 300 again.

(7) Step S407

In the case of receiving the reply of connection permission from the in-band control server 300 (Yes at Step S405), the switch 200 establishes the encrypted communication route between the switch 200 and the in-band control server 300. Here, the switch 200 receives the certification as the reply of connection permission from the in-band control server 300, creates the common key between the switch 200 and the in-band control server 300, and establishes the encrypted communication route between the switch 200 and the in-band control server 300 with use of the created common key.

(8) Step S408

The switch 200 establishes the in-band control channel between the switch 200 and the in-band control server 300.

[Registration of Switch Information to in-Band Control Server]

Figure 15:
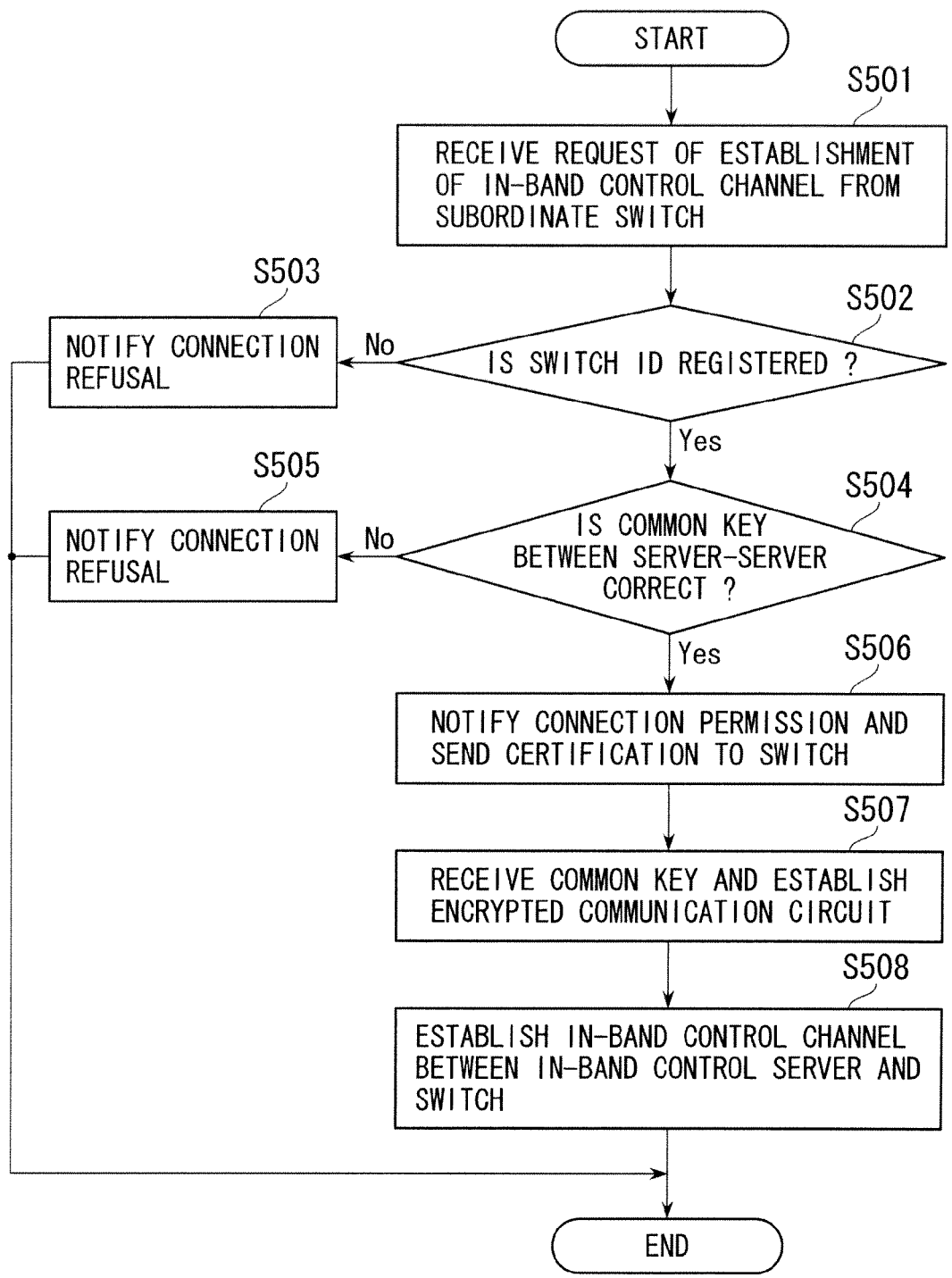
FIG. 15 is a flowchart showing an operation in registration of the switch information to the in-band control server.

FIG. 15 shows an operation in registering the information on the switch 200 of the in-band control server 300.

(1) Step S501

The in-band control server 300 receives a request of establishment of the in-band control channel from the subordinate switch 200.

(2) Step S502

In receiving the request from the switch 200, the in-band control server 300 confirms the switch information management unit 310 whether or not the information on the switch 200 is registered. Then, since the information on the switch 200 (the switch ID) was previously exchanged between the out-of-band control server 100 and the in-band control server 300, it is judged whether to accept the registration of the information on the switch 200 (the switch ID) or not, referring to the information on the switch 200 (the switch ID) and the common key between the out-of-band control server 100 and the in-band control server 300.

(3) Step S503

In the case where the information on the switch 200 (the switch ID) is not registered (No at Step S502), the in-band control server 300 notifies the switch 200 of the connection refusal.

(4) Step S504

In the case where the information on the switch 200 (the switch ID) is registered (Yes at Step S502), the in-band control server 300 confirms whether or not the common key between the out-of-band control server 100 and the in-band control server 300 is correct.

(5) Step S505

In the case where the common key between the out-of-band control server 100 and the in-band control server 300 is not correct (No at step S504), the in-band control server 300 notifies the switch 200 of the connection refusal.

(6) Step S506

In the case where the common key between the out-of-band control server 100 and the in-band control server 300 is correct (Yes at step S504), the in-band control server 300 notifies the switch 200 of the connection permission, and sends the certification to the switch 200.

(7) Step S507

As a reply to the sending of the certification, the in-band control server 300 receives the common key between the switch 200 and the in-band control server 300 from the switch 200, and establishes the encrypted communication route with use of the common key between the switch 200 and the in-band control server 300.

(8) Step S508

The in-band control server 300 establishes the in-band control channel between the switch 200 and the in-band control server 300.

[Switch Between Out-of-Band Control Server and in-Band Control Server]

Figure 16A:
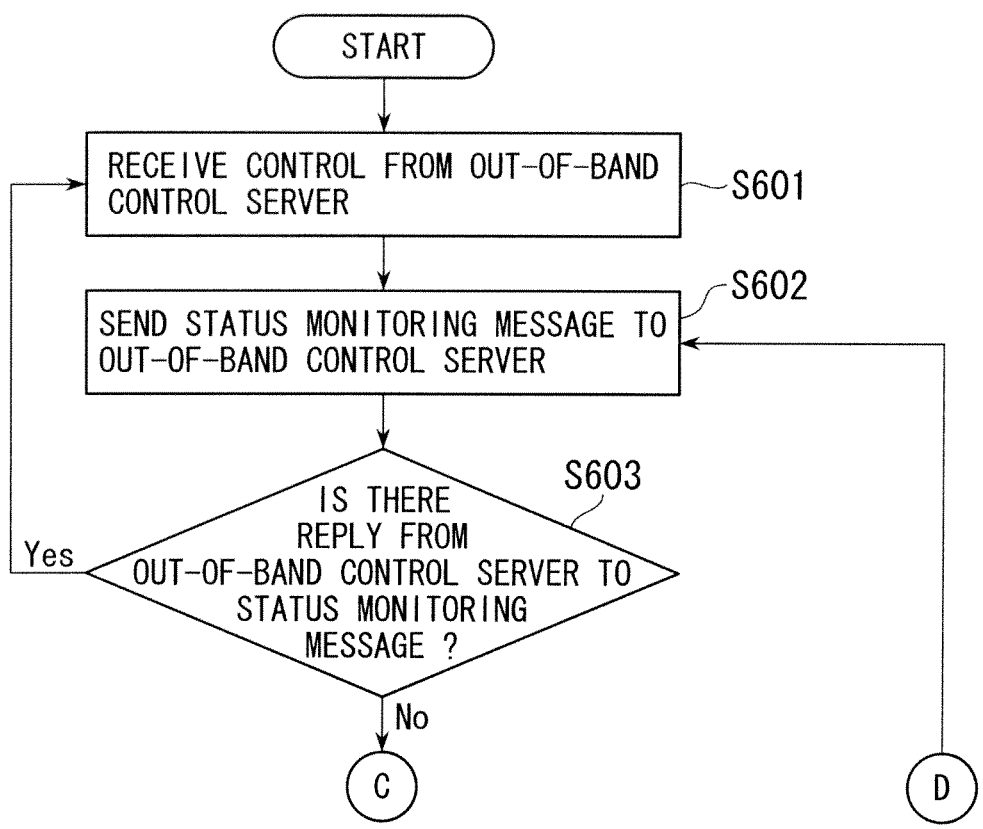
FIG. 16A is a flowchart showing an operation in switching between the out-of-band control server and the in-band control server.
Figure 16B:
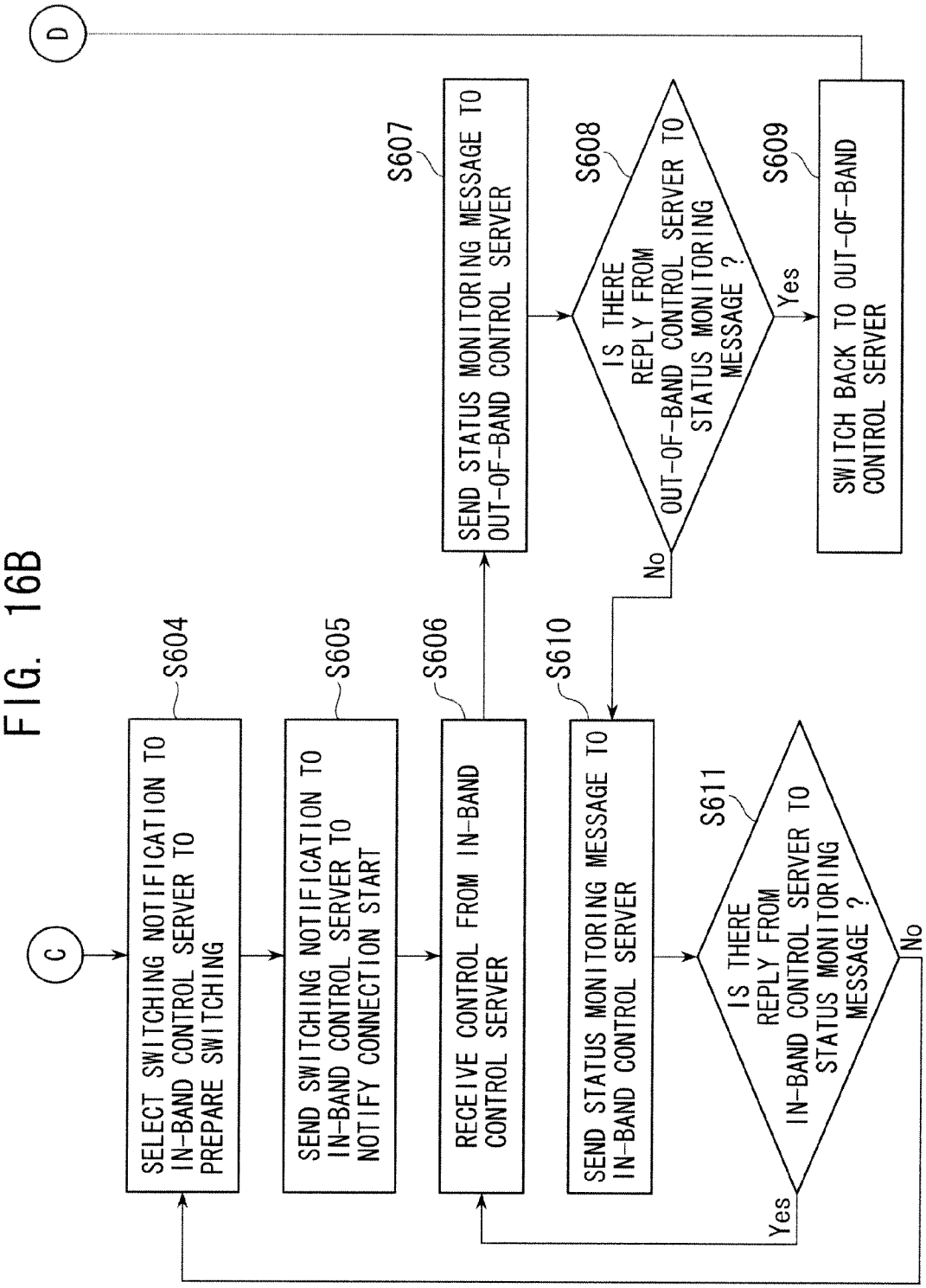
FIG. 16B is a flowchart showing the operation in switching between the out-of-band control server and the in-band control server.

FIGS. 16A and 16B show an operation where the switch 200 switches from the out-of-band control serve 100 to the in-band control server 300, or switches from the in-band control server 300 to the out-of-band control serve 100.

(1) Step S601

After connecting to each of the out-of-band control server 100 and the in-band control server 300, the switch 200 receives the control message mainly from the out-of-band control server 100.

(2) Step S602

The switch 200 periodically sends a status monitoring message to the out-of-band control server 100.

(3) Step S603

The switch 200 confirms whether or not a reply to the status monitoring message is issued from the out-of-band control server 100. In the case where the reply is issued from the out-of-band control server 100 (Yes at step S603), the switch 200 receives the control message related to the status monitor from the out-of-band control server 100.

(4) Step S604

In the case where the reply is not issued from the out-of-band control server 100 (No at step S603), the switch 200 determines that the out-of-band control server 100 is in an abnormal status, and selects the in-band control server 300 to prepare the switching to the selected in-band control server 300.

(5) Step S605

The switch 200 sends a switch notification to the in-band control server 300, and requests the connection initialization to connect to the in-band control server 300.

(6) Step S606

The switch 200 accordingly receives the control message from the in-band control server 300 at the timing when the connection to the in-band control server 300 has completed. The switch 200 receives the control message from the in-band control server 300.

(7) Step S607

Meanwhile, even the switch 200 under the connection to the in-band control server 300 periodically sends the status monitoring mess age to the out-of-band control server 100.

(8) Step S608

The switch 200 confirms to the status monitoring message whether a reply is issued or not from the out-of-band control server 100. The switch 200 checks the status of the out-of-band control server 100 on the basis of existence and nonexistence of the reply, and confirms whether the out-of-band control server 100 is restored or not.

(9) Step S609

In the case where the switch 200 has been confirmed: the issue of the reply from the out-of-band control server 100; and the restoration (Yes at step S608), the switch 200 instantly switches to return to the out-of-band control server 100, and receives the control message from the out-of-band control server 100.

(10) Step S610

In the case where the reply is not issued from the out-of-band control server 100 and the restoration has not been determined (No at step S608), the switch 200 sends the status monitoring message to the in-band control server 300.

(11) Step S611

The switch 200 confirms to the status monitoring message whether a reply is issued or not from the in-band control server 300. In the case where the reply is issued from the in-band control server 300 (Yes at step S611) the switch 200 receives the control message related to the status monitor from the in-band control server 300. Additionally, in the case where the reply is not issued from the in-band control server 300 (No at step S611), the switch 200 judges that the in-band control server 300 is in an abnormal status, and selects another in-band control server 300 to prepare the switching to the selected in-band control server 300.

[Matching of Flow Entry for Control Message]

FIG. 17 shows a mechanism for matching the flow entry for control message registered on the switch 200, the flow entry being addressed to the in-band control server 300.

(1) Step S701

The out-of-band control server 110 sends the information on the in-band control server 300 to the switch 200, and registers the flow entry to the in-band control server 300. The registered flow entry serves as the flow entry for control message. The switch 200 generates the control message to the in-band control server 300, and sends a packet of the control message.

(2) Step S702

The switch 200 performs the matching with the high priority flow entry for control message with use of a search key extracted from a header of the packet of the control message.

(3) Step S703

The switch 200 confirms whether or not the search key extracted from the header of the packet of the control message matches with the high priority flow entry for control message.

(4) Step S704

In the case where the matching was success, the switch 200 sends the control message to the in-band control server 300.

(5) Step S705

In the case where the matching is not success (No at step S703), the switch 200 confirms whether or not the search key extracted from the header of the packet of the control message matches another flow entry for control message. Here, with use of the search key extracted from the header of the packet of the control message, the switch 200 performs the matching with the high priority flow entry for control message next to the flow entry for control message to which the matching is performed in first. In the case where the matching is success, the switch 200 sends the control message to the control server corresponding to the flow entry for the control message. In the case where there is no flow entry for control message matching the search key extracted from the header of the packet of the control message, the switch 200 may discard the packet the control message.

[Extraction of Control Message from Packet Group]

FIG. 18 shows a mechanism for matching the flow entry for control message, the flow entry being for extraction of the control message mixed with the packet on the flow table on the switch 200.

(1) Step S801

The switch 200 receives the packet.

(2) Step S802

The switch 200 performs the matching with the high priority flow entry for control message with use of the search key extracted from the received packet.

(3) Step S803

The switch 200 confirms whether or not the search key extracted from the header of the received packet matches the high priority flow entry for control message.

(4) Step S804

In the case where the matching is not success (No at step S803), the switch 200 confirms whether or not the search key extracted from the header of the received packet matches another flow entry for control message. Here, with use of the search key extracted from the header of the received packet, the switch 200 performs the matching with the high priority flow entry for control message next to the flow entry for control message to which the matching is performed in first. In the case where the matching is success, the switch 200 sends the control message to the control server corresponding to the flow entry for the control message. In the case where there is no flow entry for control message matching the search key extracted from the header of the received packet, the switch 200 may discard the received packet.

(5) Step S805

In the case where the matching is success (Yes at S803), the switch 200 determines the packet is the control message, and confirms whether or not the packet is addressed to itself.

(6) Step S806

In the case where the packet is not addressed to itself (No at step S805), the switch 200 relays the control message to another switch on the basis of the address.

(7) Step S807

In the case where the packet is addressed to itself (Yes at step S805), the switch 200 forwards the control message addressed to itself to own control message processing unit 240.

Second Embodiment

A second embodiment of the present invention will be explained below.

In the case where a destination port number or a source port of TCP is defined in a protocol of a control message process (for example, TCP port number is 9999), the switch 200 can extract a control message from a flowing data traffic by using a flow entry for control message detection.

The control message is sent to own out-of-band control server, the out-of-band control server can extract a source IP address of other control servers from a header of the control message, and a connection to other control server can be tried.

[Features of the Present Invention]

The present invention realizes redundancy of the control channel due to the out-of-band control server and to the in-band control server, in the switch for forwarding a packet and the control server for determining a route.

The present invention has a mechanism for registering a flow entry for control message, from the out-of-band control server to the in-band control server, to the switch.

In the present invention, the switch ID is exchanged between the out-of-band control server and the in-band control server.

Additionally, in the present invention, the in-band control server registers another switch.

Moreover, in the present invention, a control message mixed with the packet is extracted with use of the flow entry for control message.

The present invention can be used in a network system and the like where packet forwarding means (the switch) and route information determination means (the control server) are separated from each other.

In the present invention, other control servers can be used as the in-band control server via a network of a data traffic with the switch receiving the control message from the main out-of-band control server.

Additionally, in the present invention, by registering the information on the in-band control server to the switch, the in-band control server being preliminarily requested to be connected with from the out-of-band control server, the switch can connect to the reliable other control servers (the in-band control server).

Moreover, in the present invention, the in-band control server preliminarily receives and stores: the switch ID; and the common key between server-server from another out-of-band control server, and thereby when the connection is requested by the switch, certifying the switch.

Furthermore, in the present invention, the high priority flow entry for control message is registered to the flow table of the switch from the out-of-band control server, and thereby the switch can extract a control message mixed with the data traffic.

Additionally, in the present invention, the control message is preferentially matched with due to the flow entry for control message, can be sent to the control message processing unit of the switch, and additionally the control message can be preferentially relayed to another switch.

Then, in the present invention, in the case where a trouble occurred in a monitored out-of-band control server, the switch switches from the out-of-band control server to the in-band control server once, and receives the control message from the in-band control server; however, by monitoring the out-of-band control server before the switching, when the out-of-band control server is restored, the switching can be instantly switched to return.

<Summary>

As described above, in the network system where the switch for forwarding a packet and the control server for determining the route information are separated from each other, the present invention is characterized by having a configuration to realize the redundancy of the control channel due to the out-of-band control channel and the in-band control channel in the case where the switch receives from the control server the control message related to the flow entry registration and the like based on the route information.

Figure 1:
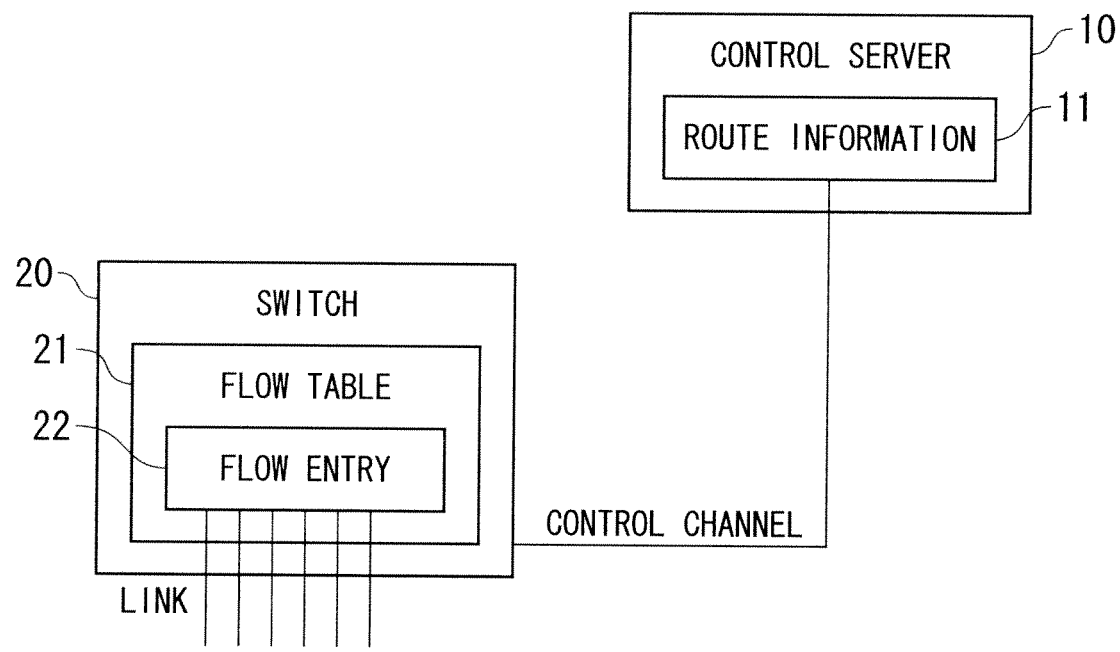
FIG. 1 is a conceptual diagram showing a basic configuration of the minimum unit of a network system.

In FIG. 1, a network system where a data plane and a control plane each configuring the control server for determining the switch and route to forward the packet are separated from each other is shown. Here, the control channel for sending and receiving the control message connects between the switch and the control server.

In FIG. 5, in order to determine the route information, the switch makes the control channel redundant by not only being connected to the control server in the out-of-band control channel but constituting the in-band control channel in which the connect on with another control server can be established via the network with use of the route for a normal data communication. Meanwhile, in the out-of band control channel, a communication route dedicated to the control message is used. Additionally, in the in-band control channel, both of the communication data and the control message share the same communication route.

According to this manner, in the present invention, since sending and receiving the control message in the out-of-band control channel and in the in-band control channel, the switch can realize the redundancy of the control channel.

FIGS. 6A and 6B show a network system including: the switch for forwarding the packet; and a control server for managing and determining the route information.

In order to connect to the control server for mainly receiving the control message in an initial configuration the switch is connected in the out-of-band control channel separately from the network for data forwarding, and the control server serves as the out-of-band control server for the switch.

The out-of-band control server requests a redundant configuration of the control channel to another control server that is already known or to be configured, the control server existing on the network. The requested another control server serves as the in-band control server for the switch.

With use of the redundancy control management unit, the out-of-band control server establishes an encrypted communication route between the out-of-band control server and the in-band control server, and notifies the in-band control server of the information on the switch managed by itself.

Moreover, the out-of-band control server notifies the switch managed by itself of the information on the in-band control server.

On the basis of the information on the in-band control server, the information being received from the out-of-band control server, the switch requests the registration of the switch to the in-band control server. On the basis of the information on the switch preliminarily received from the out-of-band control server, the in-band control server certifies the switch and registers the switch. After the registration by the in-band control server, the switch monitors the status of the in-band control server together with the out-of-band control server that mainly receives the control message.

In the case where the reply is not issued from the continuously-monitored out-of-band control server, the switch determines that a trouble occurs in the out-of-band control server, switches from the out-of-band control server to the in-band control server, and receives the control message from the in-band control server.

In this manner, the switch can receive the control message from the control channel that is made redundant by the mainly-received out-of-band control server and another control server (the in-band control server).

<Supplement>

The features of the present invention are characterized in that: the redundant configuration by the out-of-band control channel and the in-band control channel; the establishment of connectability of the in-band control channel from the out-of-band control channel; the selection of the out-of-band control channel and the in-band control channel; and the switch between the out-of-band control channel and the in-band control channel.

In the present invention, the out-of-band control server configures and establishes the control channel with the switch in the out-of-band, and sets the route information (the flow table) for the control channel between the switch and the in-band control server.

Then, the switch configures and establishes the control channel with the in-band control server, and constitutes the redundant configuration of the control server in the out-of-band control server and the in-band control server (using both of them). In addition, monitors the trouble in the control channel, and switches in the trouble occurrence from an active (a main series, an actual series) control channel to a stand-by (a waiting series, a reserve series) control channel.

The embodiment of the present invention has been described in detail above; however, the present invention is not limited to the above-described embodiment in actual, and modification within a range of the scope of the present invention is included in the present invention.

The present invention claims the priority based on Japanese Application No. 2010-000819, and the disclosure in Japanese Application No. 2010-000819 is incorporated into the present invention by reference.

The invention claimed is:

1. A network system comprising:
   a switch configured to forward a packet;
   an out-of-band control server configured to send a control message to the switch via an out-of-band control channel to determine route information; and
   an in-band control server configured to send a control message to the switch via an in-band control channel to determine route information, wherein
   the out-of-band control server is configured to:
   establish the out-of-band control channel with the switch; and
   set route information for the in-band control channel between the switch and the in-band control server.

2. The network system according to claim 1, wherein the switch is configured to:
   establish the in-band control channel with the in-band control server; and
   constitute a redundancy structure of a control server by using both of the out-of-band control server and the in-band control server.

3. The network system according to claim 2, wherein the switch is configured to:
   monitor a fault of both of the out-of-band control channel and the in-band control channel; and
   switch an active control channel to a stand-by control channel among the out-of-band control channel and the in-band control channel when the fault occurs.

4. A computer which is used as at least one of the switch, the out-of-band control server, and the in-band control server according to the network system according to claim 2.

5. The network system according to claim 2, wherein the switch is configured to:
   monitor a fault of both of the out-of-band control channel and the in-band control channel; and
   switch an active control channel to a stand-by control channel among the out-of-band control channel and the in-band control channel when the fault occurs.

6. A computer which is used as at least one of the switch, the out-of-band control server, and the in-band control server according to the network system according to claim 5.

7. A computer which is used as at least one of the switch, the out-of-band control server, and the in-band control server according to the network system according to claim 2.

8. A network redundancy method comprising:
   forwarding a packet by a switch;
   sending a control message from an out-of-band control server to the switch via an out-of-band control channel to determine route information; and
   sending a control message from an in-band control server to the switch via an in-band control channel to determine route information;
   establishing the out-of-band control channel by the out-of-band control server with the switch; and
   setting route information for the in-band control channel between the switch and the in-band control server by the out-of-bend control server.

9. The network redundancy method according to claim 8, further comprising:
   establishing the in-band control channel with the in-band control server by the switch; and
   constituting a redundancy structure of a control server by the switch by using both of the out-of-band control server and the in-band control server.

10. The network redundancy method according to claim 9, further comprising:
    monitoring a fault of both of the out-of-band control channel and the in-band control channel by the switch; and
    switching an active control channel to a stand-by control channel among the out-of-band control channel and the in-band control channel by the switch when the fault occurs.

11. A non-transitory recording medium which stores a program when executed by a processor to make a computer functions as each of the switch, the out-of-band control server, and the in-band control server according to the network redundancy method according to claim 9.

12. The network redundancy method according to claim 8, further comprising:
    monitoring a fault of both of the out-of-band control channel and the in-band control channel by the switch; and
    switching an active control channel to a stand-by control channel among the out-of-band control channel and the in-band control channel by the switch when the fault occurs.

13. A non-transitory recording medium which stores a program when executed by a processor to make a computer functions as each of the switch, the out-of-band control server, and the in-band control server according to the network redundancy method according to claim 8.

* * * * *